US006830767B2

(12) United States Patent
Teras et al.

(10) Patent No.: US 6,830,767 B2
(45) Date of Patent: Dec. 14, 2004

(54) METHOD FOR CONSTRAIN-FRYING SNACK PIECES HAVING INTACT SURFACE FEATURES

(75) Inventors: Lee Michael Teras, Cincinnati, OH (US); John Russell Herring, Jackson, TN (US); Stephen Paul Zimmerman, Wyoming, OH (US)

(73) Assignee: The Procter & Gamble Co., Cincinnati, OH (US)

( * ) Notice: Subject to any disclaimer, the term of this patent is extended or adjusted under 35 U.S.C. 154(b) by 498 days.

(21) Appl. No.: 09/864,834

(22) Filed: May 24, 2001

(65) Prior Publication Data

US 2002/0028273 A1 Mar. 7, 2002

Related U.S. Application Data

(60) Provisional application No. 60/207,944, filed on May 27, 2000.

(51) Int. Cl.⁷ .................................. A23L 1/01
(52) U.S. Cl. .................. 426/439; 426/440; 426/505; 426/808
(58) Field of Search .......................... 426/438, 439, 426/440, 496, 505, 560, 808; 99/353, 426

(56) References Cited

U.S. PATENT DOCUMENTS

| | | |
|---|---|---|
| 2,603,143 A | 7/1952 | Saenz |
| 2,704,257 A | 3/1955 | De Sollano et al. |
| 2,905,559 A | 9/1959 | Anderson et al. |
| 3,131,063 A | 4/1964 | Gerkens |
| 3,149,978 A | 9/1964 | Anderson et al. |
| 3,194,664 A | 7/1965 | Eytinge |
| 3,368,902 A | 2/1968 | Berg |
| 3,369,908 A | 2/1968 | Gonzalez et al. |
| 3,519,432 A | 7/1970 | Succo et al. |
| 3,520,248 A | 7/1970 | MacKendrick |
| 3,626,466 A | 12/1971 | Liepa |
| 3,666,511 A | 5/1972 | Williams et al. |
| 3,690,895 A | 9/1972 | Amadon et al. |
| 3,872,752 A | 3/1975 | Remde et al. |
| 3,899,602 A | 8/1975 | Rutenberg et al. |
| 3,905,285 A | 9/1975 | Campbell et al. |
| 3,935,322 A | 1/1976 | Weiss et al. |
| 3,940,505 A | 2/1976 | Nappen et al. |
| 3,966,983 A | 6/1976 | Dexter et al. |
| 3,977,897 A | 8/1976 | Wurzburg et al. |
| 4,017,460 A | 4/1977 | Tessler |
| 4,032,664 A | 6/1977 | Weiss et al. |
| 4,048,435 A | 9/1977 | Rutenberg et al. |
| 4,098,997 A | 7/1978 | Tessler |
| 4,108,033 A | 8/1978 | Bembenek |
| 4,112,222 A | 9/1978 | Jarowenko |
| 4,126,706 A | 11/1978 | Hilton |
| 4,205,601 A | 6/1980 | Velasco, Jr. |
| 4,207,355 A | 6/1980 | Chiu et al. |
| 4,221,340 A | 9/1980 | dos Santos |
| 4,229,489 A | 10/1980 | Chiu et al. |
| 4,254,699 A | 3/1981 | Skinner et al. |
| 4,299,857 A | 11/1981 | Velasco, Jr. |
| 4,312,892 A | 1/1982 | Rubio |
| 4,335,649 A | 6/1982 | Velasco, Jr. et al. |
| 4,348,166 A | 9/1982 | Fowler |
| 4,363,575 A | 12/1982 | Wisdom et al. |
| 4,381,703 A | 5/1983 | Crimmins et al. |
| 4,391,836 A | 7/1983 | Chiu |

(List continued on next page.)

FOREIGN PATENT DOCUMENTS

| | | |
|---|---|---|
| CA | 1224357 | 7/1987 |
| CA | 1270144 | 6/1990 |
| CA | 1327726 | 3/1994 |
| CA | 2105052 | 1/1997 |
| CA | 2223938 | 3/1997 |
| CA | 2174816 | 10/1998 |
| CA | 2174824 | 10/1998 |
| CA | 2289489 | 11/1998 |
| CA | 2175452 | 1/1999 |
| CA | 2115410 | 2/1999 |
| CA | 2181123 | 1/2000 |
| CA | 2339284 | 2/2000 |
| CA | 2197179 | 4/2001 |
| DE | 195 28 986 A1 | 2/1991 |
| EP | 0 348 546 | 1/1990 |
| EP | 0 482 709 A1 | 4/1992 |
| GB | 2 114 416 A | 8/1983 |
| WO | WO 95/05742 | 3/1995 |
| WO | WO 95/05744 | 3/1995 |
| WO | WO 96/01572 | 1/1996 |
| WO | WO 97/25880 | 7/1997 |
| WO | WO 98/00037 | 1/1998 |
| WO | WO 99/20125 | 4/1999 |
| WO | WO 99/33357 | 7/1999 |
| WO | WO 00/08950 | 2/2000 |
| WO | WO 00/75057 | 12/2000 |
| WO | WO 01/37672 | 5/2001 |

OTHER PUBLICATIONS

Watson, Stanley A., et al.—Corn: Chemistry and Technology, Chapter V. Alkaline–Cooked Products; 1987. American Association of Cereal Chemists, Inc., St. Paul, Minnesota, pp. 410–420.

(List continued on next page.)

*Primary Examiner*—George C. Yeung
(74) *Attorney, Agent, or Firm*—Melody A. Jones; Theodore P. Cummings

(57) ABSTRACT

Uniformly shaped snack chips, preferably tortilla-type chips, having raised surface features and a method for preparing the same. The chips can be made from a dough composition comprising pre-cooked starch-based material and pregelatinized starch. Preferably, the snack chips have raised surface features comprising from about 12% to about 40% large surface features; from about 20% to about 40% medium surface features; and from about 25% to about 60% small surface features. In one embodiment, the average thickness of the snack chip is from about 1 mm to about 3 mm; the average thickness of raised surface features is from about 2.3 mm to about 3.2 mm; the maximum thickness of the chip is less than about 5.5 mm; and the coefficient of variation of the chip thickness is greater than about 15%.

8 Claims, 11 Drawing Sheets

U.S. PATENT DOCUMENTS

| | | |
|---|---|---|
| 4,405,298 A | 9/1983 | Blain |
| 4,427,643 A | 1/1984 | Fowler |
| 4,428,972 A | 1/1984 | Wurzburg et al. |
| 4,455,321 A | 6/1984 | Glabe et al. |
| 4,513,018 A | 4/1985 | Rubio |
| 4,560,569 A | 12/1985 | Ivers |
| 4,567,051 A | 1/1986 | Baker et al. |
| 4,586,888 A | 5/1986 | Anderson |
| 4,608,264 A | 8/1986 | Fan et al. |
| 4,623,548 A | 11/1986 | Willard |
| 4,623,550 A | 11/1986 | Willard |
| 4,645,679 A | 2/1987 | Lee, III et al. |
| 4,650,687 A | 3/1987 | Willard et al. |
| 4,735,811 A | 4/1988 | Skarra et al. |
| 4,756,920 A | 7/1988 | Willard |
| 4,769,253 A | 9/1988 | Willard |
| 4,770,891 A | 9/1988 | Willard |
| 4,778,690 A | 10/1988 | Sadel, Jr. et al. |
| 4,806,377 A | 2/1989 | Ellis et al. |
| 4,834,996 A | 5/1989 | Fazzolare et al. |
| 4,859,248 A | 8/1989 | Thaler et al. |
| 4,861,609 A | 8/1989 | Willard et al. |
| 4,869,911 A | 9/1989 | Keller |
| 4,873,093 A | 10/1989 | Fazzolare et al. |
| 4,931,303 A | 6/1990 | Holm et al. |
| 4,965,081 A | 10/1990 | Lazarus |
| 4,978,548 A | 12/1990 | Cope et al. |
| 4,985,269 A | 1/1991 | Irvin et al. |
| 4,994,295 A | 2/1991 | Holm et al. |
| 5,030,468 A | 7/1991 | Van Lengerich et al. |
| 5,104,673 A | 4/1992 | Fazzolare et al. |
| 5,110,613 A | 5/1992 | Brown et al. |
| 5,131,953 A | 7/1992 | Kasica et al. |
| 5,147,675 A | 9/1992 | Gage et al. |
| 5,171,590 A | 12/1992 | Sluimer |
| 5,171,600 A | 12/1992 | Young et al. |
| 5,176,931 A | 1/1993 | Herbster |
| 5,281,276 A | 1/1994 | Chiu et al. |
| 5,281,432 A | 1/1994 | Zallie et al. |
| 5,298,274 A | 3/1994 | Khalsa |
| 5,320,858 A | 6/1994 | Fazzolare et al. |
| 5,362,511 A | 11/1994 | Villagran et al. |
| 5,366,748 A | 11/1994 | Villagran et al. |
| 5,366,749 A | 11/1994 | Frazee et al. |
| 5,395,637 A | 3/1995 | Reec |
| 5,400,704 A | 3/1995 | Huston |
| 5,401,522 A | 3/1995 | Reeg |
| 5,409,542 A | 4/1995 | Henley et al. |
| 5,429,834 A | 7/1995 | Addesso et al. |
| 5,435,851 A | 7/1995 | Kasica et al. |
| 5,470,599 A | 11/1995 | Ruhe |
| 5,500,240 A | 3/1996 | Addesso et al. |
| 5,532,013 A | 7/1996 | Martinez-Bustos et al. |
| 5,554,405 A | 9/1996 | Fazzolare et al. |
| 5,558,886 A | 9/1996 | Martinez-Bustos et al. |
| 5,558,898 A | 9/1996 | Sunderland |
| 5,576,033 A | 11/1996 | Herrera |
| 5,580,583 A | 12/1996 | Caridis et al. |
| 5,593,503 A | 1/1997 | Shi et al. |
| 5,626,898 A | 5/1997 | Caridis et al. |
| 5,629,416 A | 5/1997 | Neigel et al. |
| 5,635,235 A | 6/1997 | Sanchez et al. |
| 5,643,627 A | 7/1997 | Huang et al. |
| 5,652,010 A | 7/1997 | Gimmler et al. |
| 5,673,609 A | 10/1997 | Sanchez et al. |
| 5,683,734 A | 11/1997 | Israel |
| 5,690,982 A | 11/1997 | Fazzolare et al. |
| 5,718,770 A | 2/1998 | Shah et al. |
| 5,720,822 A | 2/1998 | Jeffcoat et al. |
| 5,720,990 A | 2/1998 | Lawrence et al. |
| 5,725,676 A | 3/1998 | Chiu et al. |
| 5,846,786 A | 12/1998 | Senkeleski et al. |
| 5,902,410 A | 5/1999 | Chiu et al. |
| 5,904,743 A | 5/1999 | Jensen et al. |
| 5,904,940 A | 5/1999 | Senkeleski et al. |
| 5,925,396 A | 7/1999 | Reed et al. |
| 5,928,701 A | 7/1999 | Jensen et al. |
| 5,932,017 A | 8/1999 | Chiu et al. |
| 5,954,883 A | 9/1999 | Nagle et al. |
| 6,001,409 A | 12/1999 | Gimmler et al. |
| 6,010,574 A | 1/2000 | Jeffcoat et al. |
| 6,022,574 A | 2/2000 | Lanner et al. |
| 6,025,011 A | 2/2000 | Wilkinson et al. |
| 6,033,707 A | 3/2000 | Lanner et al. |
| 6,054,302 A | 4/2000 | Shi et al. |
| 6,056,990 A | 5/2000 | Delrue et al. |
| 6,129,939 A | 10/2000 | Fink et al. |
| 6,136,359 A | 10/2000 | Orosa et al. |
| 6,277,423 B1 | 8/2001 | Orosa et al. |
| 6,291,001 B1 | 9/2001 | Fink et al. |

OTHER PUBLICATIONS

McCaleb, Thomas C.—American Institute of Baking, Principle of Corn Tortilla and Chip Production Seminar. Cooking and Grinding Corn, Jul. 21, 1998.

Ramirez, et al.—Cooking Time, Grinding Time, and Moisture Content Effect on Fresh Corn Masa Texture, Cereal Chemistry, vol. 71, No. 4, 1994, pp. 337–349.

Gomez, M.H., et al.—Dry Corn Flour Masa Flours for Tortilla and Snack Foods Production, Cereal Foods World, vol. 32, No. 5, 1987, pp. 372–377.

Almeida, H.D., et al.—Properties of Commercial Nixtamalized Corn Flours, Cereal Foods World, vol. 41, No. 7, 1996, pp. 624–630.

Clark, D.B.—Corn Chip Quality Depends on Masa, Chipper Snacker, vol. 43, No. 2, 1986, p. 26.

Azteca Milling Completes Expansion Project, Chipper Snacker, vol. 43, No. 2, 1986, pp. 28–29.

Whistler, Roy L., et al.—Carbohydrate Chemistry for Food Scientists, American Association of Cereal Chemists (1997), pp. 111–113.

Govindasamy, S., et al.—Enzymatic Hydrolysis of Sago Starch in a Twin Screw Extruder, Journal of Food Engineering, vol. 32, No. 4, 1998, pp. 403–426.

Govindasamy, S., et al.—Enzymatic Hydrolysis and Saccharification Optimisation of Sago Starch in a Twin Screw Extruder, Journal of Food Engineering, vol. 32, No. 4, 1998, pp. 427–446.

Roussel, L.—Sequential Heat Gelatinization and Enzymatic Hydrolysis of Corn Starch in an Extrusion Reactor, Lebensmittel–Wissenschaft–und–Technolgie, vol. 24, No. 5, 1992, pp. 449–458.

Kruger & Murray—Rheology & Texture in Food Quality, Edited by T.M. DeMan, et al. (AVI Publishing, Westport, CT, 1976) pp. 427–444 in Chapter 12.

Starch Chemistry & Technology, vol. 2, edited by R. Whistler (Academic Press, New York, NY, 1967) pp. 449–522 in Chapter 21.

Osman, E.M.—Food Theory & Applications, edited by P.C. Paul, et al. (John Wiley & Sons, Inc., New York, NY, 1972) pp. 165–171 in Chapter 4.

Valentas, K.J., et al.—Food Processing Operations and Scale Up (Marcel Dekker Inc., New York, NY, 1991) pp. 320–321.

Anderson, R.A., et al.—Gelatinzation of Corn Grits by Roll–and–Extrusion Cooking, Cereal Science Today, vol. 14, No. 1, 1969, pp. 4–12.

Chen, P., et al.—Some Tensile Characteristics of Bread Crumbs, Journal of Texture Studies, vol. 25 (1994), pp. 299–310.

Lerchenthal, C.H., et al.—Rheology and Texture of Foodstuff, Society of Chemical Industry, London, 1968, pp. 188–219.

FIGURE 1
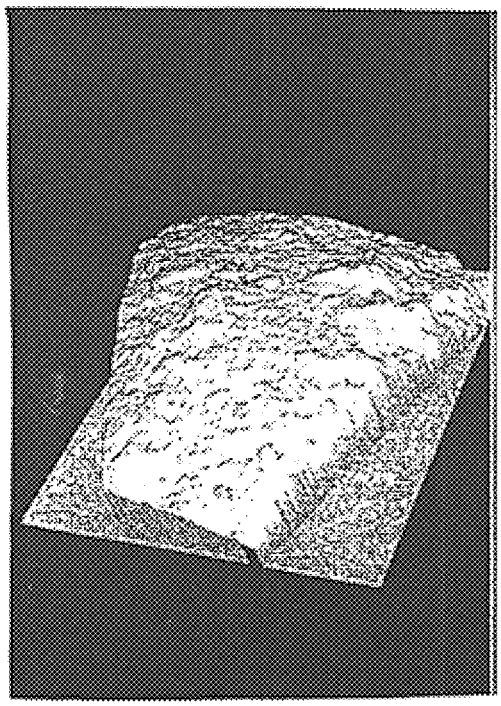
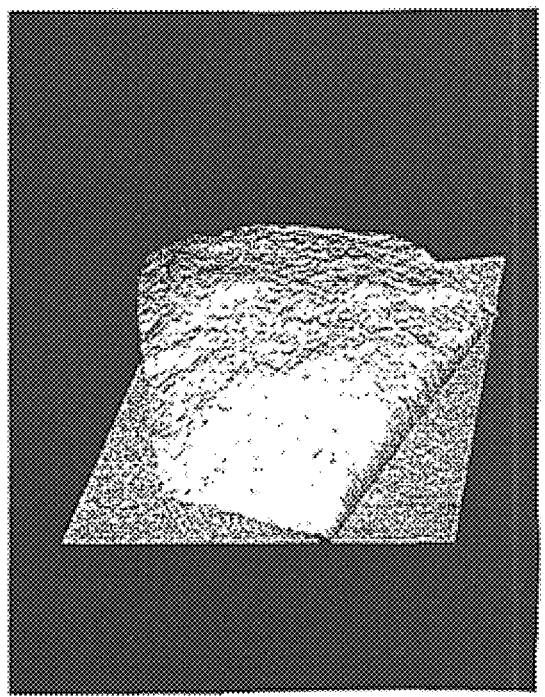

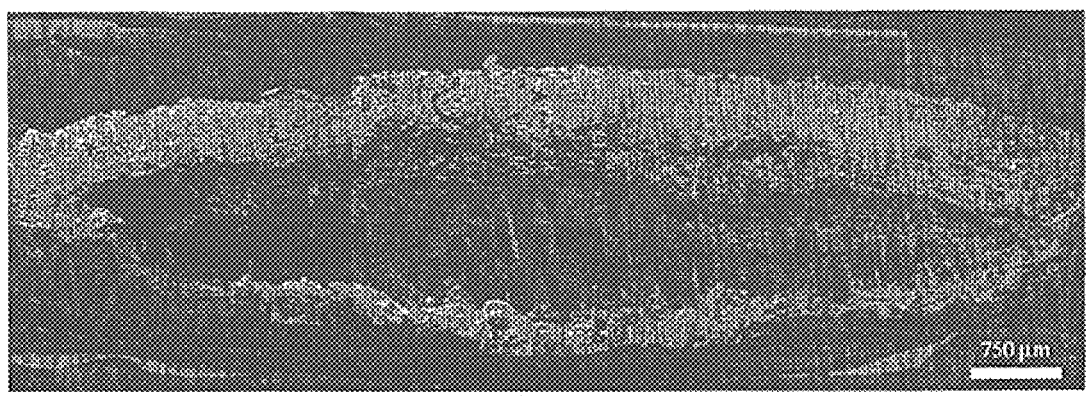
FIGURE 8
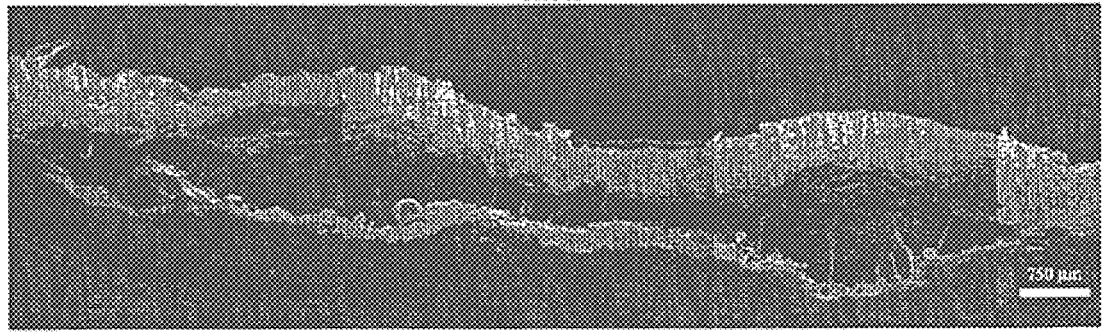

FIGURE 10
Single slice through the center of the chip sample
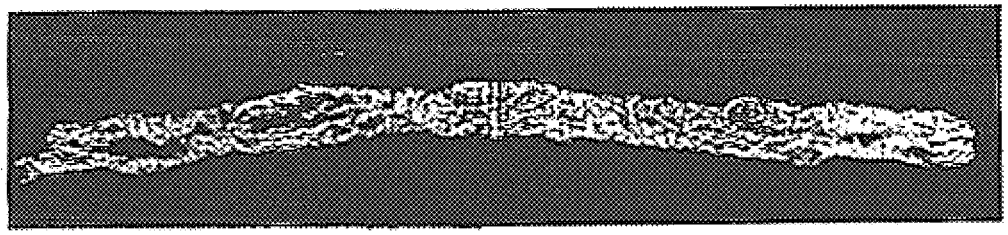
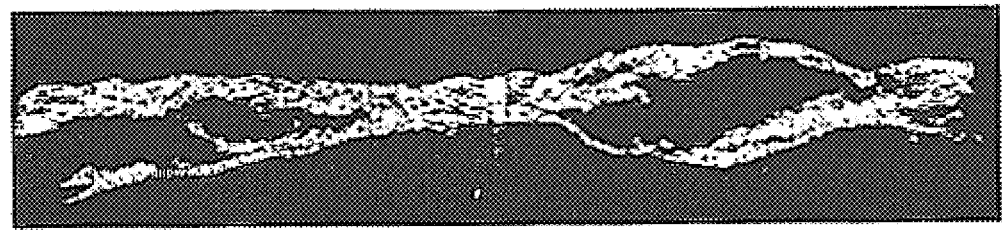

EXAMPLE GLASS TRANSITION TEMPERATURE PLOT

METHOD FOR CONSTRAIN-FRYING SNACK PIECES HAVING INTACT SURFACE FEATURES

CROSS REFERENCE TO RELATED APPLICATION

This application claims the benefit of priority to U.S. Provisional Application Ser. No. 60/207,944, filed May 27, 2000, which is herein incorporated by reference.

TECHNICAL FIELD

The present invention relates to snack chips, particularly uniformly-shaped tortilla-type chips, having raised surface features.

BACKGROUND

Tortilla chips are particularly popular consumer snack products. Tortilla chips are traditionally made from whole kernel corn that has been cooked in a hot lime solution for about 5 to about 50 minutes, then steeped overnight. The cooking-steeping process softens the outer hull and partially gelatinizes the starch in the endosperm of the corn. This cooked-steeped corn, called "nixtamal," is then washed to remove the outer hull and ground to form a plastic dough, known as "masa," that contains about 50% moisture. The freshly-ground masa is sheeted, cut into snack pieces, and baked for about 15 to about 30 seconds at a temperature of from about 575° F. to about 600° F. (302° C. to 316° C.) to reduce the moisture content to from about 20% to about 35%. The baked snack pieces are then fried in hot oil to form tortilla chips having a moisture content of less than about 3%. See, e.g., U.S. Pat. No. 905,559 to Anderson et al., U.S. Pat. No. 3,690,895 to Amadon et al., and "Corn: Chemistry and Technology," American Association of Cereal Chemists, Stanley A. Watson, et. al., Ed., pp. 410–420 (1987).

Tortilla chips can also be made from dried masa flour. In typical processes for making such dried masa flour, such as those described in U.S. Pat. No. 4,344,366 to Garza, U.S. Pat. No. 2,704,257 to Diez De Sollano et al., and U.S. Pat. No. 3,369,908 to Gonzales et al., the lime-treated corn is ground and dehydrated to a stable form. The dried masa flour can be later rehydrated with water to form a masa dough that is then used to produce tortilla chips in the traditional manner.

The finished, fried tortilla chips are characterized by randomly dispersed, raised surface features such as bubbles and blisters. The tortilla chips have a crispy, crunchy texture and a distinctive flavor characteristic of lime-treated corn products. The individual dough pieces assume random formations during frying, thus producing chips of non-uniform shape and curvature.

The finished tortilla chips are generally packaged by placing them into a bag or a large-volume canister in a randomly packed manner. Such random packing leads to a packaged product with low bulk-density. Packages with low bulk-density are essentially packages wherein the volume capacity of the package is much greater than the absolute volume of the snacks contained inside. In other words, the package contains a much lower net weight of snack pieces than could be held by the volume capacity of the package.

These large volume packages permit the randomly packed chips to settle along the bottom of the bag or can, creating a large outage in the package (i.e., the total volume of the package minus absolute volume of the product held within the package). This outage not only permits the presence of a significant amount of oxygen and moisture inside the package, thus increasing the opportunity for the chips to become rancid and stale, but also creates a lower value perception for the consumer. Furthermore, this type of package provides little protection from handling and shipping loads imposed upon the fragile chips, and thus it is quite common for consumers to find a considerable number of broken chips within the bag.

Tortilla chips and chip dips, or "salsas," are a very popular snack combination. However, because of the randomly shaped nature of the chips, consuming tortilla chips that have been dipped in salsa can create a very messy eating experience for consumers. Because of the randomly shaped nature of the chips, the chips do not adequately hold or contain the dip after it has been put on the chip; this is especially true for the fluid portion of the dip. Because most tortilla chips do not have a defined dip containment region or "well" capable of holding fluid dips on the chip, the dip or a portion thereof can readily flow off the surface of the chip, often landing undesirably on clothing or household furnishings.

Accordingly, it would be desirable to provide a uniformly shaped tortilla chip with a defined containment area for dip. It would also be desirable to provide such a tortilla chip which is capable of being stacked one upon the other to form a high-density grouped array and packaged into high-density containers, such as canisters, to reduce breakage. It would also be desirable to provide such a chip that can be produced using a simplified, one-step cooking process rather than the combined baking and frying steps employed in traditional tortilla chip manufacture.

Many problems are encountered when trying to make such a tortilla chip. The stacking of uniformly-shaped tortilla chips upon each other, such as in a nested arrangement, can lead to the abrasion and ultimate breakage of the surface features (i.e. bubbles and blisters) which are characteristic of tortilla chips. This breakage leads to an undesirable surface appearance and to the loss of the chip's crunchy texture.

To date, there has been an absence from the market of nested tortilla style chips. Tortilla style chips can be characterized by a plethora of bubble like surface features breaking through the base plain of the chips. The bubbles are a necessary part of the tortilla chip, providing a dichotomous texture experience with varying levels of crispness with each bite. The presence of bubbles in a chip made with corn is a key visual signal to the consumer of this desirable texture benefit. Corn chip products without surface bubble structures tend to have a dense or glassy texture that is less preferred by some consumers versus the light, crispy tortilla chip texture as evidenced by the more rapid growth of the tortilla chip market segment.

A potential reason for the absence of nested tortilla style chips is the inherent tradeoff that can exist between placing the fragile bubble surface features within intimate contact of adjacent chips. With nested arrangements, there is even a higher probability of direct contact between the lower surface of one chip and the upper surface of an adjacent chip. The direct contact can lead to abrasion and breakage of the surface bubbles leading to a negative visual appearance and loss of texture dichotomy. Additionally, the formulations and methods for making nested chips can directly impact the formation and strength of surface bubbles. There are several problems that make it difficult to deliver a high quality, nested tortilla style chip meeting the end consumer's expectations for this product category.

The moisture loss history of the dough piece during frying typically follows traditional drying theory, wherein there is an initial constant rate period of rapid moisture release that is not limited by diffusion through the dough. The vast majority of moisture loss occurs very early within frying when the dough first contacts the hot oil. The quality of the final product texture is highly dependent upon the early moisture loss history. The final product can assume a variety of three dimensional shapes due to the convective forces of the oil contacting the product surface during cooking.

Surface bubbles form due to a balance of simultaneous forces that include a rapid evolution of steam volume coupled with limited interstitial channels to transport the steam and localized gelatinization of the dough piece surface. A rapid evolution of steam from the constant rate period of moisture loss during frying momentarily overwhelms the diffusion capacity of the dough causing the steam to remain briefly trapped. When the steam comes in contact with a gelatinized dough region of sufficient tensile strength, a surface bubble is formed. The bubble formation is stopped when the steam eventually escapes through another surface location.

The first requirement for nested tortilla chips is that each chip should be substantially uniform in size and shape so that the chips can be fit one within another with minimal spacing between the chips. Making snack pieces of uniform size and shape can be accomplished by constraining and cooking a dough piece of a specified thickness to a predetermined size and shape between a pair of arcuate molds also of a specified size and shape. An apparatus such as the one described in U.S. Pat. No. 3,626,466 issued to Liepa on Dec. 7, 1971, can be used.

The dough must have sufficient strength to be to be formed into the shapes on the constrained frying molds, but not be so inflexible that the dough piece would crack upon bending. Removing too much water, or removal at too high of a rate during the baking step, could render a tortilla dough inflexible. Conversely, some amount of increased dough viscosity is needed to provide the strength necessary to form a defined shape. A critical level of dough viscosity is also required to enable the surface bubble expansion that occurs during frying, otherwise the bubbles would break or collapse quickly after formation. It would be ideal to have a dough composition that has both sufficient strength for bubble and shape formation and the desired flexibility, without the need for baking prior to frying. Such a dough would greatly simplify the process by eliminating a costly and complex unit operation.

A second requirement for a tortilla style chip is the presence of surface bubbles via a random expansion of the dough which is highly dependent upon the rapid release of moisture from the dough as it is cooked. However, the method of making nested snack pieces in a manner leading to low variability in size and shape of the final cooked snack pieces can lead to a lessening of heat and mass transfer rates to the constrained dough piece that are detrimental to the appearance and texture of the final product. Specifically, the molds used to constrain the dough delay the transfer of heat to the dough piece. The frying oil has a delayed contact with the dough after it first passes through or around the cooking molds. More significantly, the molds limit the rate of moisture transport away from the dough surface. As the dough heats up to reach the boiling point of water, evaporation of the water within the dough begins where the steam makes its way towards the surface of the dough piece. In typical tortilla chip making where the dough pieces are randomly free fried in the oil, the steam would quickly escape away from the chip surface. However, with constrained frying molds, resistance to the steam movement exists. The steam becomes trapped, forming a boundary layer between the dough and molds. The steam acts as an insulator preventing the hotter frying oil from contacting the dough surface, thus generating further heat and mass transport limitations. The limitations of the steam movement are further exaggerated at the bottom of the dough piece. The natural tendency for steam bubbles to rise to the surface via buoyancy forces is inhibited. The resistance created by the lower mold forces steam bubble to travel transversely along the dough surface until reaching an escape point where it can break free of the mold or dough piece and ascend vertically through the frying oil. In traditional free frying of tortilla chips, the dough piece is continually moving at random angles vs. the oil, which prevents steam from accumulating along the product surfaces.

The impact to the product of the reduced heat and mass transport that can accompany constrained frying is reduced bubble formation, leading to a final product with dense, undercooked sections containing starch with a gummy texture due to over hydration with water during cooking. Increased starch gelatinization occurs in the presence of extreme heat such as frying temperatures and water that can be readily absorbed by the starch at elevated temperatures. During traditional random free frying of tortilla chips, the moisture rapidly leaves the snack piece, thus quickly eliminating one of the conditions needed for large levels of gelatinization to occur.

Several types of texture problems can occur with constrained fried tortilla chips. A puffed chip structure can occur as a result of increased levels of gelatinized starch films forming across a large percentage of the surface of the dough, creating a barrier retaining the steam within the dough. The resulting internal pressure causes the dough piece to expand within the gap between the upper and lower mold halves. The final product can be universally expanded having a pillow like appearance with distinct surface bubbles ranging from few to none. It is possible for this puffed structure to collapse upon itself with certain dough compositions or cooling conditions post frying which leads to a further worsening of the texture.

If the heat and mass transport are more severely constrained, little to no expansion of the dough may occur. A slow evaporation of moisture and release of steam bubbles can result. Instead of a rapid constant rate period of moisture loss, the moisture evaporates slowly and at a more even rate. While the target final moisture of the product may have been met, the path to get there would be very different. Random bubble formation is absent due to a lack of a vigorous release of steam through the interstices of the dough which would have lead to small localized pockets of steam leaving the surface leaving bubbles behind in their wake. A dense, flat final chip results.

Bubbles resulting in the final product can be too weak to survive the abrasive forces that would be experienced in a nested arrangement. The dough can be spread into a thinner, weaker surface layer by the pressure of trapped steam. It has also been observed that bubbles form on each side of the chip due to increased mass transport resistance, one above the other, creating a localized region of increased thickness that is more likely to get pinched by adjacent chips by creating a common pressure point.

Accordingly, it would be desirable to provide a chip having surface features that do not break when the chips are stacked upon each other, yet is not too hard.

These and other objects of the present invention will become apparent from the following disclosure.

SUMMARY

The present invention provides uniformly shaped, tortilla type snack chips. The chips can be made from a dough compositing comprising:

a. from about 50% to about 80% of a blend comprising:
 i. at least about 50% of a precooked starch-based material;
 ii. at least about 0.5% pregelatinized starch, wherein said pregelatined starch is at least about 50% pregelatinized; and
b. from about 30% to about 60% total water.

Preferably, the snack chips have raised surface features comprising from about 12% to about 40% large surface features; from about 20% to about 40% medium surface features; and from about 25% to about 60% small surface features. In one embodiment, the average thickness of the snack chip is from about 1 mm to about 3 mm; the average thickness of raised surface features is from about 2.3 mm to about 3.2 mm; the maximum thickness of the chip is less than about 5.5 mm; and the coefficient of variation of the chip thickness is greater than about 15%.

These and other objects of the present invention will become apparent from the disclosure and claims as set forth below.

BRIEF DESCRIPTION OF THE DRAWINGS

FIG. 1 Snack Piece Surface Image by Laser Profilometry

FIG. 6 Snack Piece Interior Image via Scanning Electron Microscopy

FIG. 10 Snack Piece Cross Sectional Image via X-Ray Tomography

DETAILED DESCRIPTION

A. Definitions

Figure 2:
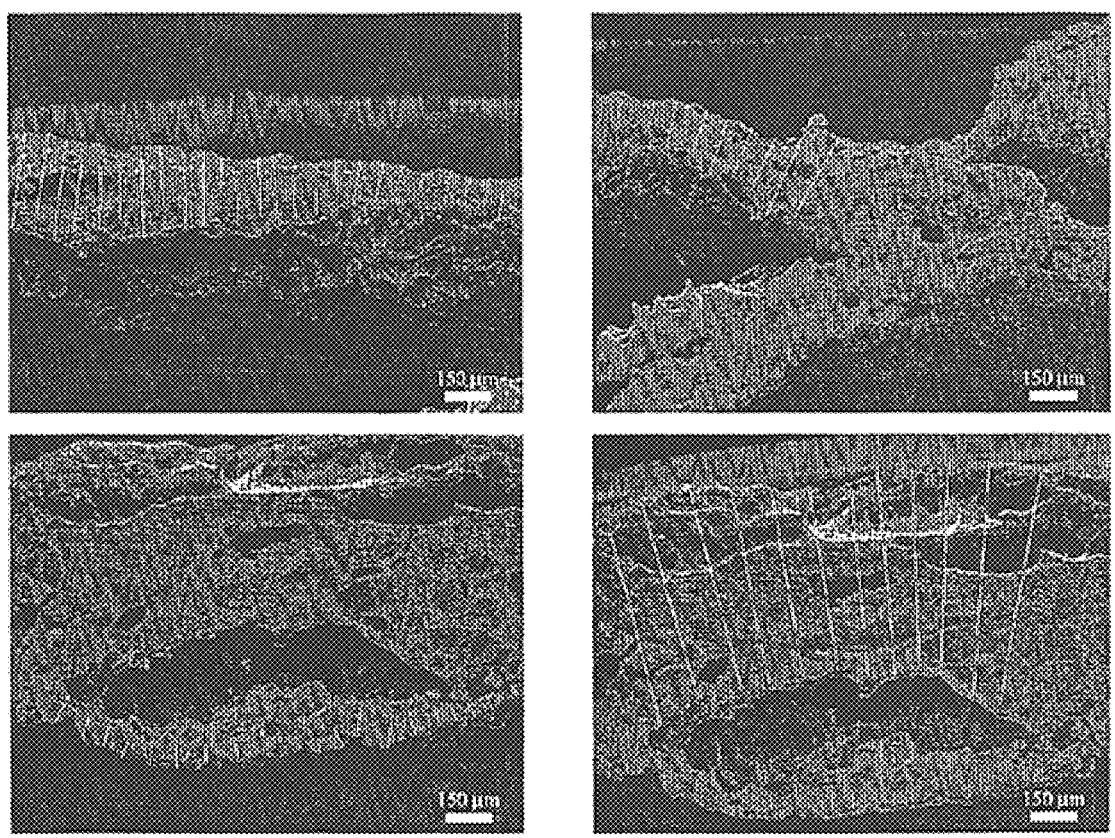
FIG. 2 Snack Piece Interior Image via Scanning Electron Microscopy
Figure 3:
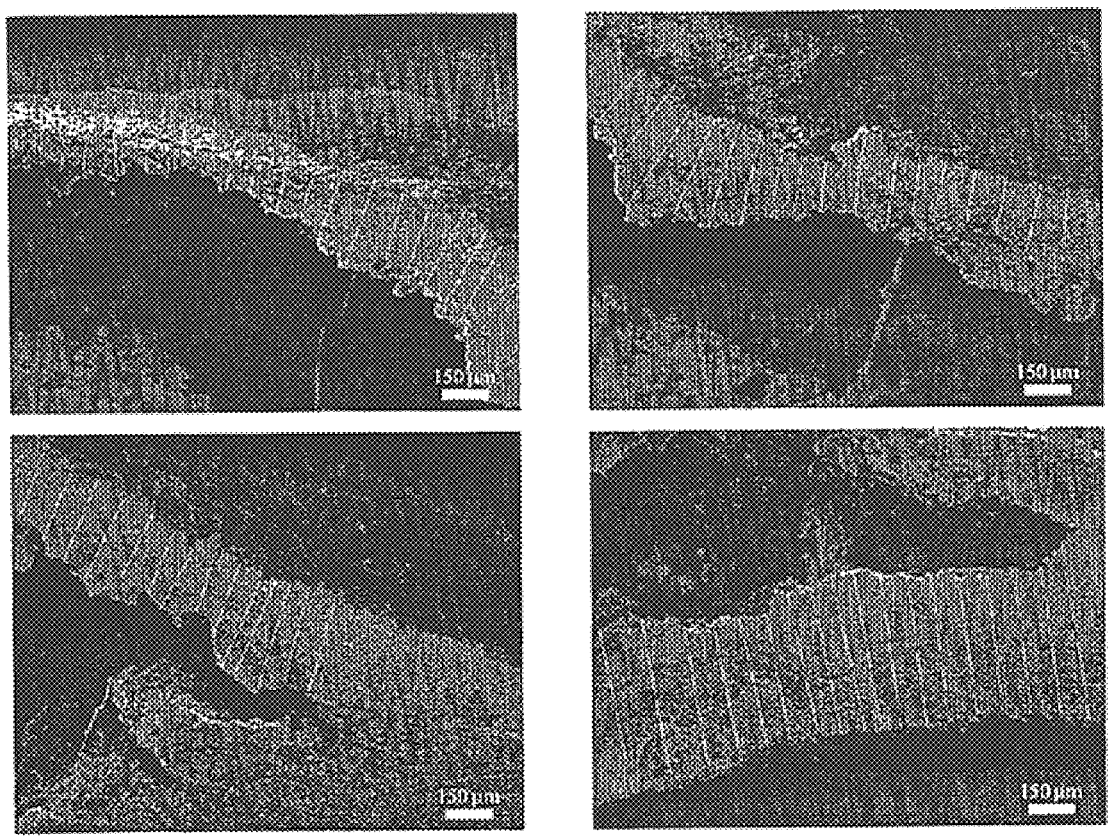
FIG. 3 Snack Piece Interior Image via Scanning Electron Microscopy
Figure 4:
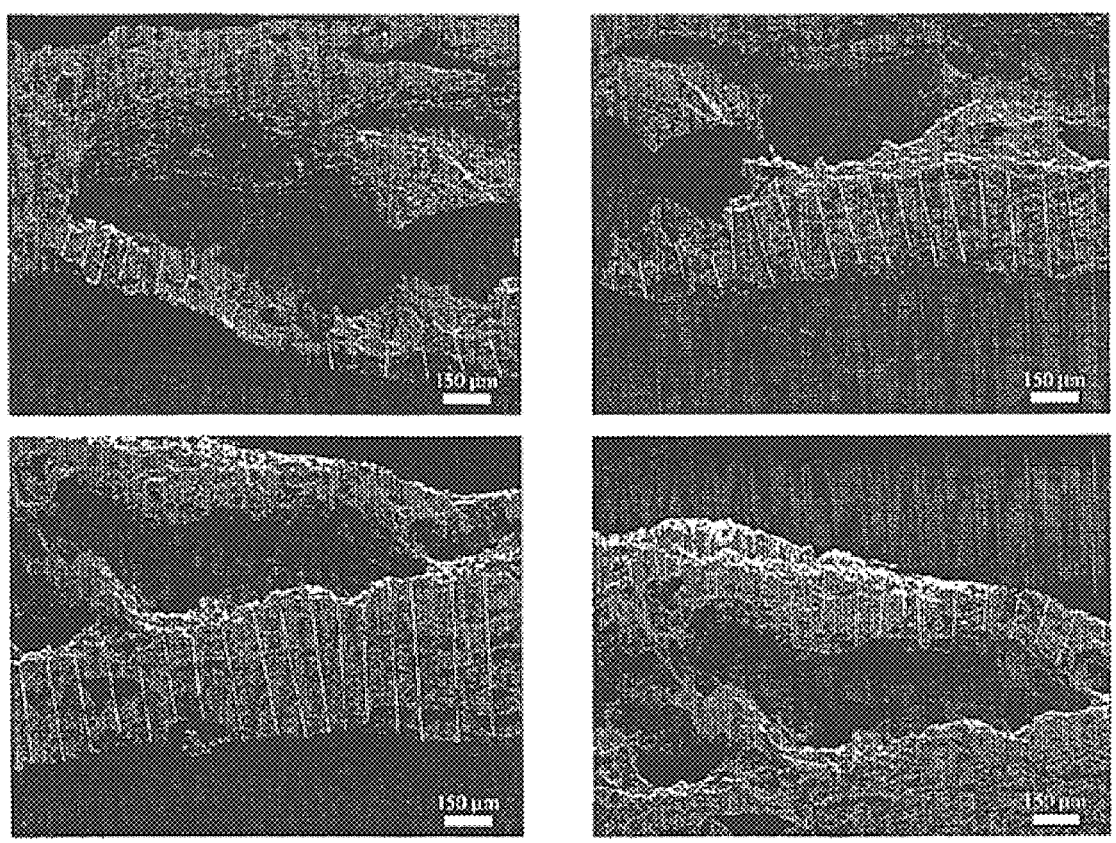
FIG. 4 Snack Piece Interior Image via Scanning Electron Microscopy
Figure 5:
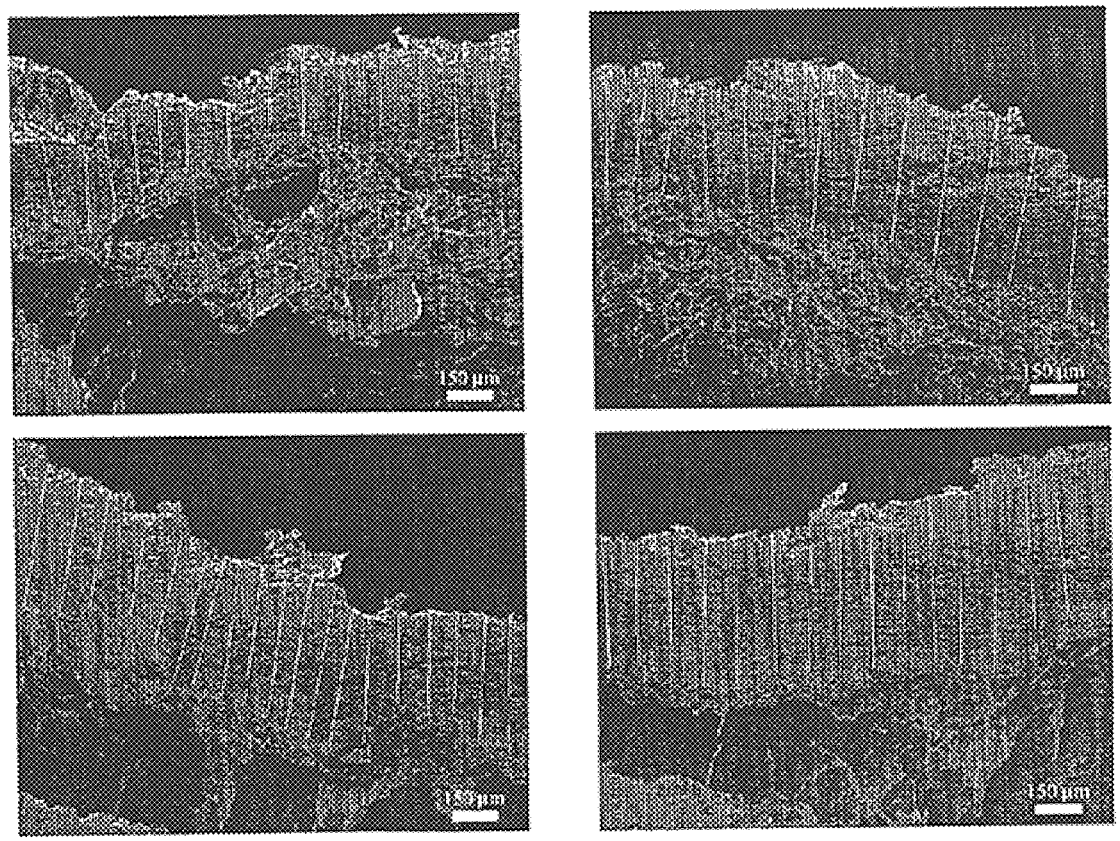
FIG. 5 Snack Piece Interior Image via Scanning Electron Microscopy
Figure 7:
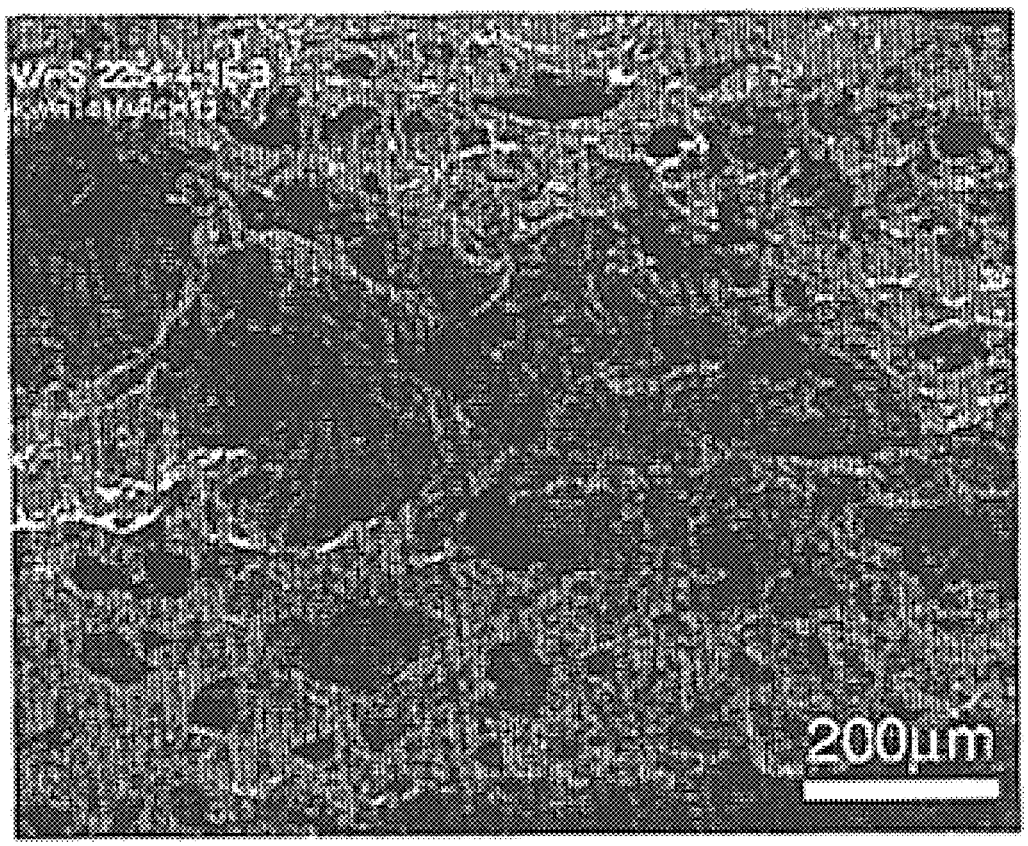
FIG. 7 Snack Piece Interior Image via Scanning Electron Microscopy

As used herein, "tortilla chip" refers to corn-based snack foods characterized by randomly dispersed, raised surface features (i.e. bubbles and/or blisters), such as tortilla chips, tortilla crisps, and other corn-based snack food products.

As used herein, "pasting temperature" is the onset temperature at which the viscosity rises more than 5 cp units per each ° C. increase in temperature, as measured using the RVA analytical method herein.

As used herein, "peak viscosity" is the highest viscosity during heating, as measured using the RVA analytical method herein.

As used herein, "final viscosity" is the final peak viscosity after cooling, as measured using the RVA analytical method herein.

As used herein, "finished product" refers to the cooked snack product.

As used herein "sheetable dough" is a dough capable of being placed on a smooth surface and rolled to the desired final thickness without tearing or forming holes. Sheetable dough can also include dough that is capable of being formed into a sheet through a process involving extrusion.

As used herein "starch-based materials" refer to naturally occurring, high polymeric carbohydrates composed of glucopyranose units, in either natural, dehydrated (e.g., flakes, granules, meal) or flour form. The starch-based materials include, but are not limited to, potato flour, potato granules, potato flanules, potato flakes, corn flour, masa corn flour, corn grits, corn meal, rice flour, buckwheat flour, oat flour, bean flour, barley flour, tapioca, as well as modified starches, native starches, and dehydrated starches, starches derived from tubers, legumes and grain, for example corn, wheat, rye, rice, waxy corn, oat, cassava, barley, waxy barley, waxy rice, glutinous rice, sweet rice, amioca, potato, waxy potato, sweet potato, sago, waxy sago, pea, sorghum, amaranth, tapioca, and mixtures thereof.

As used herein "flour" refers to the dry solids composition of a starch based matter included to make a sheetable dough system.

As used herein, the term "added water" refers to water which has been added to the dough ingredients. Water which is inherently present in the dough ingredients, such as in the case of the sources of flour and starches, is not included in the term "added water." The amount of added water includes any water used to dissolve or disperse ingredients, as well as water present in corn syrups, hydrolyzed starches, etc. For instance, if maltodextrin or corn syrup solids are added as a solution or syrup, the water in the syrup or solution must be accounted for as added water. The term "added water" does not include, however, the water present in the cereal-based flour.

As used herein, the term "moisture" refers to the total amount of water present, and includes the water inherently present as well as any water that is added to the dough ingredients.

As used herein, the term "emulsifier" refers to an emulsifier which has been added to the dough ingredients or which is already present in a dough ingredient. For instance, emulsifiers which are inherently present in the dough ingredients, such as in the case of the potato flakes, are also included in the term emulsifier.

All percentages are by weight unless otherwise specified.

The terms "fat" and "oil" are used interchangeably herein unless otherwise specified. The terms "fat" or "oil" refer to edible fatty substances in a general sense, including digestible and non-digestible fats, oils, and fat substitutes. The term includes natural or synthetic fats and oils consisting essentially of triglycerides, such as, for example soybean oil, corn oil, cottonseed oil, sunflower oil, mid-oleic sunflower oil, high oleic sunflower oil, palm oil, coconut oil, canola oil, fish oil, lard and tallow, which may have been partially or completely hydrogenated or modified otherwise, as well as non-toxic fatty materials having properties similar to triglycerides, herein referred to as non-digestible fats, which materials may be partially or fully indigestible. Reduced calorie fats and edible non-digestible fats, oils or fat substitutes are also included in the term.

The term "non-digestible fat" refers to those edible fatty materials that are partially or totally indigestible, e.g., polyol fatty acid polyesters, such as OLEAN™.

Mixtures of fats and/or oils are also included in the terms fat and oil.

By "polyol" is meant a polyhydric alcohol containing at least 4, preferably from 4 to 11 hydroxyl groups. Polyols include sugars (i.e., monosaccharides, disaccharides, and trisaccharides), sugar alcohols, other sugar derivatives (i.e., alkyl glucosides), polyglycerols such as diglycerol and triglycerol, pentaerythritol, sugar ethers such as sorbitan and polyvinyl alcohols. Specific examples of suitable sugars, sugar alcohols and sugar derivatives include xylose, arabinose, ribose, xylitol, erythritol, glucose, methyl glucoside, mannose, galactose, fructose, sorbitol, maltose, lactose, sucrose, raffinose, and maltotriose.

By "polyol fatty acid polyester" is meant a polyol having at least 4 fatty acid ester groups. Polyol fatty acid esters that contain 3 or less fatty acid ester groups are generally digested in, and the products of digestion are absorbed from, the intestinal tract much in the manner of ordinary triglyceride fats or oils, whereas those polyol fatty acid esters containing 4 or more fatty acid ester groups are substantially non-digestible and consequently non-absorbable by the human body. It is not necessary that all of the hydroxyl groups of the polyol be esterified, but it is preferable that disaccharide molecules contain no more than 3 unesterified hydroxyl groups for the purpose of being non-digestible. Typically, substantially all, e.g., at least about 85%, of the hydroxyl groups of the polyol are esterified. In the case of sucrose polyesters, typically from about 7 to 8 of the hydroxyl groups of the polyol are esterified.

The polyol fatty acid esters typically contain fatty acid groups typically having at least 4 carbon atoms and up to 26 carbon atoms. These fatty acid radicals can be derived from naturally occurring or synthetic fatty acids. The fatty acid radicals can be saturated or unsaturated, including positional or geometric isomers, e.g., cis- or trans- isomers, and can be the same for all ester groups, or can be mixtures of different fatty acids.

Liquid non-digestible oils can also be used in the practice of the present invention. Liquid non-digestible oils have a complete melting point below about 37° C. include liquid polyol fatty acid polyesters (see Jandacek; U.S. Pat. No. 4,005,195; issued Jan. 25, 1977); liquid esters of tricarballylic acids (see Hamm; U.S. Pat. No. 4,508,746; issued Apr. 2, 1985); liquid diesters of dicarboxylic acids such as derivatives of malonic and succinic acid (see Fulcher; U.S. Pat. No. 4,582,927 issued Apr. 15, 1986); liquid triglycerides of alpha-branched chain carboxylic acids (see Whyte; U.S. Pat. No. 3,579,548; issued May 18, 1971); liquid ethers and ether esters containing the neopentyl moiety (see Minich; U.S. Pat. No. 2,962,419; issued Nov. 29, 1960); liquid fatty polyethers of polyglycerol (See Hunter et al; U.S. Pat. No. 3,932,532; issued Jan. 13, 1976); liquid alkyl glycoside fatty acid polyesters (see Meyer et al; U.S. Pat. No. 4,840,815; issued Jun. 20, 1989); liquid polyesters of two ether linked hydroxypolycarboxylic acids (e.g., citric or isocitric acid) (see Huhn et al; U.S. Pat. No. 4,888,195; issued Dec. 19, 1988); various liquid esterfied alkoxylated polyols including liquid esters of epoxide-extended polyols such as liquid esterified propoxylated glycerins (see White et al; U.S. Pat. No. 4,861,613; issued Aug. 29, 1989; Cooper et al; U.S. Pat. No. 5,399,729; issued Mar. 21, 1995; Mazurek; U.S. Pat. No. 5,589,217; issued Dec. 31, 1996; and Mazurek; U.S. Pat. No. 5,597,605; issued Jan. 28, 1997); liquid esterified ethoxylated sugar and sugar alcohol esters (see Ennis et al; U.S. Pat. No. 5,077,073); liquid esterified ethoxylated alkyl glycosides (see Ennis et al; U.S. Pat. No. 5,059,443, issued Oct. 22, 1991); liquid esterified alkoxylated polysaccharides (see Cooper; U.S. Pat. No. 5,273,772; issued Dec. 28, 1993); liquid linked esterified alkoxylated polyols (see Ferenz; U.S. Pat. No. 5,427,815; issued Jun. 27, 1995 and Ferenz et al; U.S. Pat. No. 5,374,446; issued Dec. 20, 1994); liquid esterfied polyoxyalkylene block copolymers (see Cooper; U.S. Pat. No. 5,308,634; issued May 3, 1994); liquid esterified polyethers containing ring-opened oxolane units (see Cooper; U.S. Pat. No. 5,389,392; issued Feb. 14, 1995); liquid alkoxylated polyglycerol polyesters (see Harris; U.S. Pat. No. 5,399,371; issued Mar. 21, 1995); liquid partially esterified polysaccharides (see White; U.S. Pat. No. 4,959, 466; issued Sep. 25, 1990); as well as liquid polydimethyl siloxanes (e.g., Fluid Silicones available from Dow Corming). All of the foregoing patents relating to the liquid nondigestible oil component are incorporated herein by reference. Solid non-digestible fats or other solid materials can be added to the liquid non-digestible oils to prevent passive oil loss. Particularly preferred non-digestible fat compositions include those described in U.S. Pat. No. 5,490, 995 issued to Corrigan, 1996, U.S. Pat. No. 5,480,667 issued to Corrigan et al, 1996, U.S. Pat. No. 5,451,416 issued to Johnston et al, 1995 and U.S. Pat. No. 5,422,131 issued to Elsen et al, 1995. U.S. Pat. No. 5,419,925 issued to Seiden et al, 1995 describes mixtures of reduced calorie triglycerides and polyol polyesters that can be used herein but provides more digestible fat than is typically preferred.

The preferred non-digestible fats are fatty materials having properties similar to triglycerides such as sucrose polyesters. OLEAN™, a preferred non-digestible fat, is made by The Procter and Gamble Company. These preferred non-digestible fat are described in Young; et al., U.S. Pat. No. 5,085,884, issued Feb. 4, 1992, and U.S. Pat. No. 5,422,131, issued Jun. 6, 1995 to Elsen et al.

B. Dough

A particularly important aspect of the present invention is the dough. The dough of the present invention comprises from about 50% to about 80% of an ingredient blend and from about 30% to about 60% total water ("total moisture"). The ingredient blend comprises: (1) pre-cooked starch-based material; (2) pre-gelatinized starch, and optionally but preferably (3) emulsifier. The ingredient blend can optionally comprise native flour, a protein source, modified starch, resistant starch, or mixtures thereof. The flour can optionally comprise other minor ingredients such as colors, nutrients, or flavors. The level of "added water" added to form the dough is typically from about 20% to about 50% when the ingredient blend is made from dry flour materials.

It was surprisingly found that the achievement of a tortilla style chip without baking before frying could be accomplished by careful control of the dough composition and specific raw material properties. The resulting final products have a random, bubbly surface appearance with the crisp, dichotomous texture characteristic of a tortilla chip.

1. Ingredient Blend

Pre-Cooked Starch-Based Material

The flour blend of the present invention comprises a pre-cooked starch based material. A preferred embodiment of the present development comprises the use of pre-cooked starch-based material derived from suitable cereal grains that include but are not limited to wheat, corn, rye, oats, barley, sorghum or mixtures thereof. More preferably corn is the source of the cereal grain.

The pre-cooked starch-based material comprises at least about 50%, preferably from about 50% to about 90%, and more preferably from about 55% to about 80%, cereal-based flour.

The pre-cooked starch-based material is cooked preferably in the presence of water to a level of gelatinization sufficient to enable sheeting upon hydration of the starch based material, where the term "gelatinization" refers to the expansion of starch granules upon exposure to water and heating. Pre-cooked starch-based material prepared in this manner is herein defined as "masa." A dough can be made directly from the pre-cooked starch-based material. In a preferred embodiment, the pre-cooked starch-based material is dried and ground to form a dry, granular flour then subsequently rehydrated to form a sheetable dough. The pre-cooked starch-based material is preferably dried to a final moisture content by weight of from about 5% to about 25% when processed to form a dry flour.

Several physical properties of the pre-cooked starch-based material relating to its degree of cook are critical to delivering good bubble expansion control and desired sheeting properties. Extra consideration needs to be given for the analyses of the properties of the pre-cooked starch-based material when it is in its wet state where it is taken directly from the cooking preparation process for analysis. The level of water present from the cooking preparation step within the masa needs to be taken into account. A sample of the wet masa should be first analyzed for its total moisture content using a vacuum oven. The total moisture present within the wet masa should be subtracted from any analyses wherein water is being added to the masa, such as for Water Absorption Index (WAI) and Rapid Viscomteric Analyses (RVA), both of which are described herein. Both of these analyses use an excess of water that is kept at a generally constant level relative to the weight of the dry material solids that are present within the sample. Accounting for the water present from the wet masa enhances the accuracy and consistency of these analyses.

Freeze drying the wet masa provides another sample preparation method for analyzing the properties of the material. A wet masa sample of from about 20 grams to about 50 grams is first freeze dried to a moisture content of from about 7% to about 15%. The dried sample is then granulated by placement on a U.S. #20 standard sieve wherein the sieve is followed by several sieves of decreasing mesh size. Five marbles are placed on each sieve and the set of sieves is shaken using a Ro-Tap sieve shaker made by U.S. Tyler and Company of Mentor, Ohio. Methods for assessing wet and dry masa properties are reviewed in Ramirez et al., "Cooking Time, Grinding Time, and Moisture Content Effect on Fresh Corn Masa Texture", *Cereal-Chemistry*, 71 (4), 1994, p. 337–349. When conducting WAI and RVA analyses, the moisture present within the freeze dried sample should be determined by vacuum oven drying and subtracted from the amount of excess water that is added to the sample to conduct the analysis.

Alternately, the wet masa material can be dried using other means and ground to have a granular, flour like consistency. The wet masa can be prepared for analysis by drying and grinding to form a dry flour by one skilled in the art. The drying can be accomplished via several methods including, but not limited to, drum drying, oven drying, fluidized bed drying, preferably vacuum oven drying, and more preferably vacuum fluidized bed drying. The wet masa should be dried to a final moisture level by weight of from about 7% to about 16%. Preferably the material is agitated during drying by mechanical or convective means to avoid clumping or agglomeration to promote uniform drying throughout the material. The drying temperature and length of drying should be set so that the desired moisture range is achieved without burning the material as evidenced by a pungent, acrid aroma, smoking, or the presence of frequent dark discoloration within the dried material. The drying time will generally be from about 5 minutes to about 30 minutes and the drying temperature from about 250° F. to about 550° F. Factors such as the level of moisture within the masa, degree of cook, and level of agitation can effect the establishment of optimum drying conditions. The dried material should then be ground to a granular flour using suitable methods including, but not limited to, attrition milling, pin milling, communitation, cutting, or grinding such as hammer milling or between a pair of stones. The preferred particle size distribution (PSD) to deliver consistent analyses is from about 0% to about 15% by weight remaining on a standard U.S. number 16 sieve (1190 micron screen size), from about 5% to about 30% by weight remaining on a standard U.S. number 25 sieve (710 micron screen size), from about 5% to about 30% by weight remaining on a standard U.S. number 40 sieve (425 micron screen size), from about 20% to about 60% by weight remaining on a standard U.S. number 100 sieve (150 micron screen size), from about 3% to about 25% by weight remaining on a standard U.S. number 200 sieve (75 micron screen size), and from about 0% to about 20% by weight through a standard U.S. number 200 sieve (75 micron screen size). The grinding procedure to prepare the dried wet masa sample for analyses can be readily determined by one skilled in the art.

Two measures that relate to the pre-cooked starch-based material's ability to hydrate and release amylose at a crucial level to building a strong dough sheet are the viscosity and water absorption index (WAI). The WAI relates to the swelling power of the starch resulting from the uptake of water. The viscosity is measured as a function of temperature using a Rapid Viscometric Analysis (RVA) method with a model RVA-4 instrument made by Newport Scientific Co. Inc. The pasting temperature of the pre-cooked starch-based material should be from about 140° to about 209° F., preferably from about 160° F. to about 194° F. The peak viscosity of pre-cooked starch-based material should be from about 200 centipoise to about 1500 centipoise (cp), preferably from about 300 cp to about 1300 cp. The final viscosity of the pre-cooked starch-based material should be from about 500 cp to about 2200 cp, preferably from about 600 cp to about 2000 cp. The WAI of the pre-cooked starch-based material should be from about 2 to about 4, preferably from about 3 to about 4.

The particle size distribution (PSD) of the pre-cooked starch-based material is an important parameter for controlling the level of bubble development. A very fine material will result in a puffed, over expanded chip with very little bubble definition. Increased localized fat concentration at the snack chip surface can also result, creating a very greasy, undesirable mouth impression during eating. Conversely, a very coarse flour will result in little to no expansion with few bubbles present on the chip surface. The presence of coarse material interrupts the dough structure, providing nucleation sites and vent holes for steam to escape during frying. An abundance of vent holes reduces the dough diffusional resistance and allows the steam to escape before a bubble is formed. The amount of pre-cooked starch-based material by weight that should remain on a #16 U.S. sieve (1190 micron screen size) should be from about 0% to about 15%, preferably from about 2% to about 10%, more preferably from about 3% to about 7%, and most preferably from about 3% to about 5%. The amount of pre-cooked starch-based material by weight that should remain on a #25 U.S. sieve (710 micron screen size) should be from about 5% to about 30%, preferably from about 10% to about 25%, and more preferably from about 12% to about 20%, and most preferably from about 14% to about 18%. The amount of pre-cooked starch-based material by weight that should remain on a #40 U.S. sieve (425 micron screen size) should be from about 5% to about 30%, preferably from about 12% to about 20%, and most preferably from about 14% to about 18%. The amount of pre-cooked starch-based material by weight that should remain on a #100 U.S. sieve (150 micron screen size) should be from about 20% to about 60%, preferably from about 32% to about 48%, and most preferably from about 37% to about 46%. The amount of pre-cooked starch-based material by weight that should remain on a #200 U.S. sieve (75 micron screen size) should be from about 3% to about 25%, preferably from about 7% to about 20%, and most preferably from about 12% to about 18%. The amount of pre-cooked starch-based material by weight that should pass through a #200 U.S. sieve (75 micron screen size) should be from about 0% to about 20%, preferably from about 4% to about 16%, and most preferably from about 6% to about 10%. In the case of a wet pre-cooked starch-based material, the freeze drying and granulation method previously described can be used to determine the particle size distribution. The source of the coarse particles can also include legumes such as beans, starches or fabricated particulates or cracked rice, dry milled wheat, dry milled corn, dry milled sorghum, rolled oats, rolled barley, or rolled rye. Preferably the source of the coarse particles is the same as that of the bulk flour.

Pre-cooked starch-based material of the present invention consisting essentially of corn that has been cooked and steeped in a lime-water solution to generate a distinct tortilla flavor character and to soften the corn kernels to release starch is preferred. Corn treated in this manner is herein defined as corn masa. The steps for preparing corn masa typically include cooking whole kernel corn in a lime-water solution that comprises from about 0.1% to about 2% lime (on a weight of corn basis) for from about 5 minutes to about 180 minutes at from about 160° F. to about 212° F. The heat is then removed from the cooked corn in solution and the mixture is allowed to steep for from about 2 hours to about 24 hours. The corn is then washed repeatedly to remove the lime-water, optionally quenched and mixed to form a cohesive dough. The cooked corn material is then ready for processing into a sheetable dough. The process for cooking corn in an alkaline solution is often termed "nixtamalization" with the end dough product termed "nixtamal," as is described in "Dry Corn Flour Masa Flours for Tortilla and Snack Foods", M. H. Gomez et al., *Cereal Foods World*, 32/5,372., "Properties of Commercial Nixtamalized Corn Flours", H. D. Almeida et al., *Cereal Foods World*, 41/7, 624, U.S. Pat. No. 3,194,664 (Eytinge, 1965), U.S. Pat. No. 4,205,601 (Velasco, Jr., 1980), U.S. Pat. No. 4,299,857 (Velasco, Jr., 1981), U.S. Pat. No. 4,254,699 (Skinner, 1981), U.S. Pat. No. 4,335,649 (Velasco, Jr. et al., 1982), U.S. Pat. No. 4,363,575 (Wisdom, 1982), U.S. Pat. No. 4,381,703 (Crimmins, 1983) and U.S. Pat. No. 4,427,643 (Fowler, 1984). A waxy corn based masa permitting the production of low-oil content products is disclosed in U.S. Pat. No. 4,806,377 (Ellis et al., 1989).

The cooked corn can be used in its wet state or, more preferably, the cooked corn can undergo a drying step followed by grinding to produce a dry masa flour. As used herein, "corn masa" includes the cooked corn in either its wet or dry (masa flour) states. The process for making masa flours using an extrusion approach can be referenced in U.S. Pat. No. 4,221,340 (dos Santos, 1980), U.S. Pat. No. 4,312,892 (Rubio, 1982), U.S. Pat. No. 4,513,018 (Rubio, 1985), U.S. Pat. No. 4,985,269 (Irvin et al., 1991), U.S. Pat. No. 5,176,931 (Herbster, 1993), U.S. Pat. No. 5,532,013 (Martinez-Bustos et al., 1996), U.S. Pat. No. 5,558,886 (Martinez-Bustos et al., 1996), U.S. Pat. No. 5,558,898 (Sunderland, 1996), U.S. Pat. No. 6,025,011 (Wilkinson et al., 2000). An alternate process for making a comminuted cooked corn dough can be referenced in U.S. Pat. No. 4,645,679 (Lee, III et al., 1987). A further alternate approach using a two stage admixing and steep process preferably using waxy corn based starches can be referenced in U.S. Pat. No. 5,429,834 (Addesso et al.), U.S. Pat. No. 5,554,405 (Fazzolare et al., 1996), U.S. Pat. No. 5,625,010 (Gimmlet et al., 1997), and U.S. Pat. No. 6,001,409 (Gimmler et al., 1999). The flavor of the masa can be tailored by addition of a germinated grain such as corn which can be referenced in U.S. Pat. No. 5,298,274 (Khalsa, 1994).

In a preferred embodiment, dry corn masa flour is used. Processes for making dry corn masa flour can be found in Gomez et al., "Dry Corn Masa Flours for Tortilla and Snack Food Production", *Cereal Foods World*, 32 (5), 1987, p. 372 and Clark, D. B., "Corn Chip Quality Depends on Masa", *Chipper Snacker*, Apr. 1983, p.26 and "Azteca Milling Completes Expansion Project", *Chipper Snacker*, 43 (2), 1986, p.28. Preferred corn masas include white corn masa and yellow corn masa.

Preferably, the flour blend of the present invention comprises from about 40% to about 95% corn masa flour, preferably from about 40% to about 90%, more preferably from about 55% to about 80%, still more preferably from about 65% to about 80%, and most preferably from about 70% to about 80%.

A masa flour with the desired properties can be obtained by processing the flour as a single lot with a continuous sequence of cooking through drying. Alternately, the masa flour can be made via a blend of multiple lots made at different times using different process conditions.

Other flours that can be included in the corn-based flour include, but are not limited to, ground corn, corn flour, corn grits, corn meal, and mixtures thereof. These corn-based flours can be blended to make snacks of different composition and flavor.

Starches

It was important to the present development that the composition of all the starches be balanced to provide hydration, bonding, and water release properties favorable to dough expansion, bubble development and bubble set. It was observed that chips with desired levels of bubbling and acceptable texture in mouth could be produced by admixing of specific masa flour and pre-gelatinized starches compositions. The final product can be optionally optimized further by the addition of modified starches, resistant starches, protein, and minor ingredients. The key mechanism leading to texture and appearance improvements is believed to be a more controlled hydration during mixing and preferred rate of dehydration during frying of the partially and fully gelled starches.

Pre-Gelatinized Starch

The ingredient blend of the present invention comprises pre-gelatinized starch. As used herein, references to "starch" in this description are meant to include their corresponding flours. The flour blend comprises by weight on a dry basis from about 0.5% to about 30% pre-gelatinized starch, preferably from about 2% to about 30%, and more preferably from about 4% to about 30%, still more preferably from about 4% to about 20%, and most preferably from about 4% to about 10%. This pre-gelatinized starch is added to the flour blend, and is over and above that inherently present in the cereal-based flour or any of the other flour blend ingredients.

The level of gelatinized starch present in the dry flour is a critical element towards delivering the desired dough sheeting and bubble expansion properties. Addition of the pre-gelled starch singularly to the cereal-based flour is sufficient to delivering the desired bubble expansion properties. Gelatinization is defined as the swelling of starch granules due to the absorption and uptake of water which is accelerated with increasing temperature and available water. As the starch granules swell, birefringence is lost. The term gelatinization refers to starch granules which have lost their polarization crosses when viewed under stereo-light microscopy and may or may have not lost their granular structure.

In traditional tortilla making which relies upon baking, the surface of the dough sheet increases in viscosity due to the baking process which removes water while also increasing starch gelatinization. The baking process causes random surface drying where varying levels of moisture pockets exist below the surface of the dough. These moisture pockets become the source for steam bubbles during frying that lead to localized dough expansion. The increased gelatinization that occurs during baking provides the dough strength needed to hold the expansion allowing a bubble to set. A traditional tortilla process optionally has an equilibration step after baking to allow moisture to migrate from the center to the edge of the dough piece. The baked dough can take up to about 3 minutes to equilibrate adding a lengthy step in the making process.

The pre-gelatinized starch helps to develop the dough strength, provides a firm definition to the dough, and helps to control the expansion of the dough during frying. The pre-gelatinized starch helps to bind the dough once hydrated, enabling formation of surface bubbles and providing a cohesive structure in which the steam can uniformly expand during frying to provide both optimal texture and visual definition of shape.

It was found during this development that adding pre-gelatinized starch or flour can enable improved surface bubble development and texture expansion and in a preferred embodiment can be used to replace the baking step used in traditional tortilla chip-making processes. The type and level of the pre-gelatinized flour are very important. Too little flour results in a weak dough sheet that won't support expansion. Adding too much results is a puffed chip due to too much dough surface bonding and strength which retains too much of the steam during frying.

The level of gelatinization for the pre-gelatinized starch or flour should be greater than about 50%, preferably greater than about 65%, more preferably greater than about 80%, and most preferably greater than about 90%. Measuring for the loss of birefringence and loss of crystallinity via polarized light microscopy is one method for determining levels of gelatinization where the proportion of non-birefringent or non-crystalline starch granules to the total observed relates to the level of gelatinization. *Carbohydrate Chemistry for Food Scientists* by Roy L. Whistler and James N. BeMiller, American association of Cereal Chemists, 1997 describes starch gelatinization properties and measurement methods. Alternately, a preferred method for measuring the level of gelatinization is by enzyme catalyzed hydrolysis where the pre-gelled starch is reacted with an enzyme such as 1,4-alpha-glucosidase or alpha-amylase. The pre-gelled starch more readily hydrolizes to form sugars with increased levels of gelatinization. In general, the level of saccharification that occurs with hydrolization corresponds to the level of gelatinization of the starch material. References for measurement of gelatinization by enzyme catalyzed hydrolysis can be found in Govindasamy, S. et al., "Enzymatic Hydrolysis of Sago Starch in a Twin Screw Extruder", *Journal of Food Engineering,* 32 (4), 1998, p. 403–426 and Govindasamy, S. et al., "Enzymatic Hydrolysis and Saccharifiaction Optimisation of Sago Starch in a Twin Screw Extruder", *Journal of Food Engineering,* 32 (4), 1998, p. 427–446 and Roussel, L., "Sequential Heat Gelatinization and Enzymatic Hydrolysis of Corn Starch in an Extrusion Reactor", *Lebensmittel-Wissenschaft-und-Technolgie,* 24 (5) 1992, p. 449–458.

Generally, thermal processes are used to make the pre-gelatinized starch or flour which can include batch processes, autoclaving or continuous processes involving a heat exchanger or jet-cooker. The gelatinized starch or flour can be made by cooking a starch containing carbohydrate source with water to the desired level of gelatinization. See the discussion at pp. 427–444 in Chapter 12, by Kruger & Murray of *Rheology & Texture in Food Quality,* Edited by T M. DeMan et al. (AVI Publishing, Westport, Conn., 1976), at pp. 449–520 in Chapter 21 of *Starch Chemistry & Technology,* Vol. 2, edited by R. Whistler (Academic Press, New York, N.Y., 1967) and at pp. 165–171 in Chapter 4 by E. M. Osman of *Food Theory & Applications,* edited by P. C. Paul et al. (John Wiley 7 Sons, Inc. New York, N.Y. 1972). Another cooking process is the use of a twin screw extruder where the starch containing carbohydrate is fed with water into the extruder where increased temperature and pressure cook the starch to high levels of gelatinization. A process for preparing a pre-gelled starch using an atomized starch mixture and sonic pulse combustion engine can be referenced in U.S. Pat. No. 4,859,248 (Thaler et al., 1989).

The degree of cook and subsequent level of gelatinization of the pre-gelled starch material can be well characterized by its RVA viscosity profile and water absorption properties. The peak viscosity of the pre-gelled starch should be from about 20 cp to about 5000 cp, preferably from about 500 cp to about 4600 cp, and most preferably from about 1500 cp to about 4600 cp. The final viscosity of the pre-gelled starch should be from about 10 cp to about 4000 cp, preferably from about 50 cp to about 3000 cp, and most preferably from about 300 cp to about 2700 cp. The WAI of the pre-gelled starch should be from about 4 to about 20, preferably from about 6 to about 18, and most preferably from about 12 to about 16.

Suitable sources of starch based carbohydrates to make the gelatinized starch include corn, wheat, rye, rice, waxy corn, oat, cassava, barley, waxy barley, waxy rice, glutinous rice, sweet rice, amioca, potato, waxy potato, sweet potato, sago, waxy sago, pea, sorghum, amaranth, tapioca, and mixtures thereof, preferably include tapioca, corn, or sago palm starches, and most preferably include sago palm starch. Preferred sources of pre-gelatinized starches include dent corn and sago palm that have been processed to a high degree of cook.

As an alternate embodiment, the pre-gelled starches can be used to provide coarse particle size material to the flour blend.

Native Starch

The flour blend can comprise from less than about 25%, preferably less than about 18%, more preferably from about 1% to about 15%, and most preferably from about 3% to about 7% native flour. As used herein, a "native" starch is one as it is found in nature and the term "starch" in this description is meant to include their corresponding flours. Native starches are those that have not been pre-treated or pre-cooked. Suitable native starches include those derived from tubers, legumes, and grains, such as corn, wheat, rye, rice, waxy corn, oat, cassava, barley, waxy barley, waxy rice, glutinous rice, sweet rice, amioca, potato, waxy potato, sweet potato, sago, waxy sago, pea, sorghum, amaranth, tapioca, and mixtures thereof. Especially preferred are native flours derived from corn.

It is desirable to control the level of hydration of masa flour and pre-gelled starches by adding an un-cooked native starch to the flour blend. The native flour provides a buffer that governs the hydration rate and level of the more cooked starch materials. The starches within the native flour yield water upon heating such as that which occurs during frying with some of the water instantly evaporating as steam from the surface of the chip and some diffusing to adjacent pre-gelled starch molecules. This has the effect of slowly metering water to the pre-gelled starches enabling them to hydrate and expand at a more controlled rate than if all of the water from a dough system where readily available.

The addition of native starch improves the crispness of the final product in two ways. First, the presence of native flour prevents the pre-gelatinized starches from overcooking during frying and thus producing a snack with a gummy, softer consistency. Second, native starch dehydrates more rapidly during frying, leaving behind regions of crisp, more intact starch cells.

In an alternate embodiment, the native starches can be used to provide coarse particle size material to the flour blend.

Modified Starch

Modified starch can be included in the flour blend to enhance the crispness of the final product. Modified starches suitable for use herein include any suitable food starch which has been modified by conversion (enzyme, heat, or acid conversion), acetylation, chlorination, acid hydrolysis, enzymatic action, oxidation, the introduction of carboxyl, sulfate, or sulfonate groups, oxidation, phosphorylation, etherification, esterification, and/or chemical cross linking or include at least partial hydrolysis and/or chemical modification. Suitable modified starches can be derived from starches such as corn, wheat, rye, rice, waxy corn, oat, cassava, barley, waxy barley, waxy rice, glutinous rice, sweet rice, amioca, potato, waxy potato, sweet potato, sago, waxy sago, pea, sorghum, amaranth, tapioca, and mixtures thereof. As used herein, "modified starch" also includes starches tailored or bred to have certain properties, such as hybrids bred to contain high levels of amylose, as well as starches that are "purified" to deliver selected preferred compositions.

The flour blend can include less than about 35%, preferably less than about 15%, more preferably from about 1% to about 10%, and most preferably from about 3% to about 8% modified starch. The modified starch herein is modified starch over and above that inherently present in the other flour blend ingredients of the present invention.

Especially preferred sources of modified starch are those derived from waxy maize corn, high amylose corn, and tapioca. Preferred waxy maize derived starches include Baka-Plus®, Baka-Snak®, Thermtex, and N-Creamer® 46, available from National Starch and Chemical Co., Bridgewater, N.J. Preferred high amylose corn derived starches include Hylon® VII, Crisp Film®, and National® 1900, available from National Starch and Chemical Co., Bridgewater, N.J. The amylose content of high amylose starches is preferably greater than 40% and more preferably greater than 70%. Methods for delivering high amylose starches can be referenced in U.S. Pat. No. 5,131,953 (Kasica et al., 1992), U.S. Pat. No. 5,281,432 (Zallie et al., 1994), and U.S. Pat. No. 5,435,851 (Kasica et al. 1995). The level of high amylose starches delivering beneficial crisp texture results can be added at a level of from about 1% to about 12%, preferably from about 3% to about 9%, and most preferably from about 4% to about 8%. Preferred tapioca derived starches include UltraTex® III and Amioca®, also available from the National Starch and Chemical Co., Bridgewater, N.J. The pasting temperature of the high amylose starches is preferably from about 170° F. to about 200° F., more preferably from about 185° F. to about 195° F. The RVA measured peak viscosity of the high amylose starch is preferably from about 200 cp to about 400 cp, more preferably from about 220 cp to about 270 cp. The RVA measured final viscosity of the high amylose starch is preferably from about 300 cp to about 500 cp, more preferably from about 400 cp to about 500 cp.

Modified starch refers to starch that has been physically or chemically altered to improve its functional characteristics. Suitable modified starches include, but are not limited to, pregelatinized starches, low viscosity starches (e.g., dextrins, acid-modified starches, oxidized starches, enzyme modified starches), stabilized starches (e.g., starch esters, starch ethers), cross-linked starches, starch sugars (e.g. glucose syrup, dextrose, isoglucose) and starches that have received a combination of treatments (e.g., cross-linking and gelatinization) and mixtures thereof. Suitable starches and methods of manufacture can be referenced in U.S. Pat. No. 3,899,602 (Rutenberg et al., 1975), U.S. Pat. No. 3,940,505 (Nappen et al., 1976), U.S. Pat. No. 3,977,879 (Wurzburg et al., 1976), U.S. Pat. No. 4,017,460 (Tessler, 1977), U.S. Pat. No. 4,048,435 (Rutenberg et al., 1977), U.S. Pat. No. 4,098,997 (Tessler, 1978), U.S. Pat. No. 4,112,222 (Jarowenko, 1978), U.S. Pat. No. 4,207,355 (Chiu et al., 1980), U.S. Pat. No. 4,229,489 (Chiu et al., 1980), U.S. Pat. No. 4,391,836 (Chiu, 1983), U.S. Pat. No. 4,428,972 (Wurzburg et al., 1984), U.S. Pat. No. 5,629,416 (Neigel et al., 1997), U.S. Pat. No. 5,643,627 (Huang et al., 1997), U.S. Pat. No. 5,718,770 (Shah et al., 1998), U.S. Pat. No. 5,720,822 (Jeffcoat et al., 1998), U.S. Pat. No. 5,725,676 (Chiu et al, 1998), U.S. Pat. No. 5,846,786 (Senkeleski et al., 1998), U.S. Pat. No. 5,904,940 (Senkeleski et al., 1999), U.S. Pat. No. 5,932,017 (Chiu et al., 1999), U.S. Pat. No. 5,954,883 (Nagle et al., 1999), U.S. Pat. No. 6,010,574 (Jeffcoat et al., 2000), and U.S. Pat. No. 6,054,302 (Shi et al., 2000).

Hydrolyzed starch can be used as a modified starch herein. The term "hydrolyzed starch" refers to oligosaccharide-type materials that are typically obtained by acid and/or enzymatic hydrolysis of starches, preferably corn starch. Suitable hydrolyzed starches for inclusion in the dough include maltodextrins and corn syrup solids. The hydrolyzed starches preferably have Dextrose Equivalent (DE) values of from about 5 to about 36 DE, preferably from about 10 to about 30 DE, and more preferably about 10 to about 20 DE. The DE value is a measure of the reducing equivalence of the hydrolyzed starch referenced to dextrose and expressed as a percentage (on a dry basis). The higher the DE value, the more reducing sugars are present and the higher the dextrose equivalence of the starch. Maltrin™ M050, M100, M150, M180, M200, and M250, available from Grain Processing Corporation of Muscatine, Iowa, are preferred maltodextrins.

Resistant Starch

The flour blend can comprise less than about 10%, preferably less than about 6%, more preferably from about 1% to about 4%, and most preferably from about 2% to about 3% resistant starch. Resistant starches function much like insoluble dietary fiber with limited water absorption properties. The inclusion of resistant starch in the flour blend produces a beneficial impact on the final product texture by providing an additional metering mechanism of water to the more gelatinized starches. It will tend to slowly release low levels of water throughout frying.

Resistant starches are made by first cooking, drying and then heat treating the dried starch under specific conditions to produce a starch material that is amylase resistant and non-digestible in the small intestine.

Resistant starches suitable for use in the present can be referenced in U.S. Pat. No. 5,281,276 (Chiu et al., 1994), U.S. Pat. No. 5,409,542 (Henley et al., 1995), U.S. Pat. No. 5,593,503 (Shi et al. 1997), and U.S. Pat. No. 5,902,410 (Chiu et al., 1999) and are herein incorporated by reference. An especially preferred resistant starch is Novelose® 240, available from National Starch and Chemical Co., Bridgewater, N.J.

In an alternate embodiment an insoluble dietary fiber can be used in place of the resistant starch. The RVA measured peak viscosity of the fiber or like material should preferably be from about 10 cp to about 70 cp, more preferably from about 20 cp to about 50 cp. The RVA measured final viscosity of the fiber or like material should preferably be from about 5 cp to about 50 cp, more preferably from about 10 cp to about 40 cp.

Protein Source

The flour blend can comprise up to about 3% of a purified protein source, preferably up to about 2%, more preferably from about 0% to about 1%. A purified protein source is defined as one where the protein has been removed or extracted from a native or modified food material. Suitable sources of protein include dairy, whey, soy, pea, egg white, wheat gluten, corn, and mixtures thereof. Especially preferred are proteins derived from corn (zein) and egg white solids. The purified protein is added on top of any protein source inherent within other flour blend materials such as the cereal-based flour, pre-gelled starches, native flour, or modified starches.

The addition of protein to the flour blend improves the final texture of the product. The protein source may be added directly to the flour blend or, alternatively, in the form of a liquid suspension that is added with the water in making the dough.

Minor Ingredients

The flour blend can comprise minor ingredients, preferably at a total level of less than about 8%. Minor ingredients can added to the flour blend to improve the flavor, nutritional, and/or aesthetic properties of the final product. Suitable minor ingredients include, but are not limited to salt, sugar, flavorings, legumes, colorants, seasonings, vitamins, minerals, particulates, herbs, spices, flow aids, food grade particulates, and mixtures thereof. Salt and sugar are preferably each added at levels of from about 0.25% to about 3%, preferably from about 0.25% to about 1.5%.

Preferred minor ingredients for flavor or aesthetic presentation include dehydrated vegetables, onion, garlic, tarragon, dill, marjoram, sage, basil, thyme, oregano, cumin, cilantro, chili powder, coriander, mustard, mustard seed, rosemary, paprika, curry, cardamon, fennel seeds, bay, laurel, cloves, fennugrek, parsley, turmeric, chives, scallions, leeks, shallots, cayenne pepper, bell pepper, and hot peppers.

The addition of visually discernible particulates can improve the visual appeal of the finished snack. The addition of flavored particulates can reduce or eliminate the need to add topical flavorings or seasonings. In addition, particulates which are functional, such as fibers, vitamins, or minerals, can enhance the health benefits of the snack. Suitable particulates for use herein include, but are not limited to, cereal bran (e.g. wheat, rice, or corn bran), spices, herbs, dried vegetables, nuts, seeds, dried vegetables (e.g. sun dried tomatoes, dried green or red peppers), dried fruits, or mixtures thereof. An approach for adding minor ingredients to enhance the final product texture and appearance can be referenced in U.S. Pat. No. 5,110,613 (Brown et al, 1992).

Expansion properties of the dough can be further tailored by the addition of plasticizing agents such as monosacharides, polysacharides, and edible alcohols. References to compositions utilizing these materials can be found in U.S. Pat. No. 4,735,811 (Skarra et al., 1988) and U.S. Pat. No. 4,869,911 (Keller, 1989).

Vitamin C can preferably be added at a level such that the final snack comprises from about 2 mg to about 120 mg, preferably from about 15 mg to about 60 mg, of Vitamin C per one ounce serving of the snack. In addition to providing nutritional benefits to the snack, Vitamin C can also function as a flavor potentiator and as an antioxidant.

Another minor ingredient that can be included in the flour blend or as part of an aqueous system is citric acid. Citric acid can be added to reduce browning color development during the cooking of the dough and to act as a chelating agent to reduce lipid oxidation for metals that may be contained in the frying oil. Citric acid is preferably added by weight of the flour at a level of from about 0.01% to about 1.5%, more preferably from about 0.05% to about 1.0%.

A minor ingredient that can added to further increase the dough sheet strength is an aspirated corn bran which can be referenced in U.S. Pat. No. 6,056,990 (Delrue et al., 2000).

2. Properties of the Ingredient Blend

To obtain a finished product with the desired crispness and crunchiness, it is important that the ingredient blend have certain physical properties which are characterized by: (1) viscosity, (2) water absorption index ("WAI"), and (3) particle size distribution ("PSD").

The viscosity of the preferred ingredient blend is characterized by a pasting temperature of from about 150° F. to about 200° F., more preferably from about 155° F. to about 185° F.; a peak viscosity of from about 300 cp to about 1100 cp, more preferably from about 400 cp to about 700 cp; and a final viscosity of from about 400 cp to about 5000 cp, more preferably from about 1000 cp to about 1500 cp.

The preferred ingredient blend additionally should have a WAI of from about 2 to about 4, more preferably from about 3 to about 3.5.

Furthermore, the PSD of the ingredient blend should be such that the amount remaining on a #16 U.S. sieve by weight should be from about 0% to about 8%, preferably from about 0.5% to about 5%, more preferably from about 0.5% to about 2%; the amount remaining on a #25 U.S. sieve by weight should be from about 2% to about 25%, preferably from about 4% to about 15%, more preferably from about 6% to about 12%; the amount remaining on a #40 U.S. sieve should be from about 3% to about 30%, preferably from about 6% to about 27%, more preferably from about 7% to about 15%; the amount remaining on a #100 U.S. sieve should be from about 10% to about 70%, preferably from about 20% to about 60%, more preferably from about 25% to about 55%; the amount remaining on a #200 U.S. sieve should be from about 10% to about 40%, preferably from about 10% to about 30%, more preferably from about 15% to about 25%.

3. Total and Added Water

The dough of the present invention comprises less than about 50% added water, preferably from about 20% to about 40%, more preferably from about 20% to about 37%, still more preferably from about 25% to about 36%, and most preferably from about 28% to about 34%. This level of water provides a sheetable, cohesive dough which can be shaped.

The dough of the present invention comprises less than about 60% total water, preferably from about 30% to about 50%, more preferably from about 30% to about 47%, still more preferably from about 35% to about 46%, and most preferably from about 38% to about 44%. It can be more convenient to determine the dough composition based on total water when the ingredient blend comprises a wet pre-cooked starch based material.

Preferably, the temperature of the added water is from about 75° F. to about 185° F., more preferably from about 95° F. to about 185° F., still more preferably from about 140° F. to about 185° F., and most preferably from about 160° F. to about 180° F.

Additives that are water soluble or that are capable of forming a suspension can optionally be included with the added water to form an aqueous system pre-mix. Examples of such optional additives include salt, sugar, citric acid, ascorbic acid, flavors, hydrolyzed starches with a DE of from about 5 to about 36, and processing aids such as lipids or emulsifiers.

4. Emulsifier

An emulsifier can optionally be included in the dough. Emulsifier helps to maintain the integrity of the dough's starch structure and rheology throughout the sheeting process and to reduce the dough's pressure sensitive adhesiveness. Typically, emulsifiers are added to the dough based on the weight of the flour in an amount of from about 0.01% to about 6%, preferably from about 0.05% to about 4%, and more preferably from about 0.1% to about 1.2%.

Suitable emulsifiers include lecithin, mono-and diglycerides, diacetyl tartaric acid esters, propylene glycol mono-and diesters, polyglycerols, and mixtures thereof. Polyglycerol emulsifiers such as monoesters of polyglycerols, can be used. Particularly preferred monoglycerides are sold under the trade names of Dimodan® available from Danisco, New Century, Kans. and DMG® 70, available from Archer Daniels Midland Company, Decatur, Ill.

An especially preferred emulsifier is lecithin. Preferably, the lecithin is added in an oil suspension during preparation of the dough or as a dry powder as part of the flour blend. Also acceptable, but not as preferred, is the addition of lecithin via aqueous suspension as described in U.S. Pat. No. 4,560,569, issued Dec. 24, 1985 to Ivers et al.

In order to produce a non-adhesive dough yet not compromise the final product crispness, the level of lecithin per weight of dry flour should be less than about 2%, more preferably less than about 1.2%, still more preferably less than about 0.7%, and most preferably from about 0.1% to about 0.5%. Especially preferred powdered lecithins include Precept® 8160 and Precept® 8162 brands, available from the Central Soya Co., Fort Wayne, Ind. and the Ultralec-F brand available from the ADM Co., of Decatur, Ill.

Other preferred emulsifiers include polyglycerol esters of lower molecular weight. These are predominantly polyglycerols which are diglycerol or triglycerol entities. When glycerine is polymerized, a mixture of polyglycerols are formed. A preferred emulsifier for use herein is a diglycerol monoester which is a mixture of monoesters of polyglycerol which is predominantly a diglycerol. The preferred fatty acids used to made the esters are saturated and unsaturated fatty acids having from about 12 to about 22 carbon atoms. The most preferred diglycerol monoester is diglycerol monopalmitate.

The level of polyglycerol ester added per weight of dry flour should be less than about 1%, more preferably less than about 0.7%, still more preferably less than about 0.3%, and most preferably from about 0.02% to about 0.15%. An especially preferred emulsifier comprises a mixture of lecithin and polyglycerol ester in the form of an aqueous suspension.

The emulsifier can be added via a variety of methods. For instance, the emulsifier can be mixed as a separate stream with the flour and water, pre-mixed with an aqueous solution to form a suspension or emulsion then added to the dough, or added as a dry ingredient to the flour blend. When mixing the emulsifier with an aqueous system, it is important to thoroughly shear mix the aqueous blend with the emulsifier to disperse the emulsifier as a fine droplet phase.

Furthermore, the emulsifier can be dissolved in a fat or in a polyol fatty acid polyester such as Olean™, available from The Procter and Gamble Company.

Preferably, the emulsifier is heated to form a liquid state at a temperature of greater than about 150° F., then blended with an aqueous system that is at a temperature greater than about 150° F., more preferably greater than about 170° F.

Alternatively, the emulsifier can be added by topically applying to the dough or by coating pieces of dough-making equipment. Emulsifier can be applied to the sheeted dough surface by any number of means including, but not limited to, spraying, roller coating, wick coating, or brushing at a continuous or intermittent application frequency. Preferably, when applied in such a manner, the emulsifier is diluted in an aqueous or lipid carrier to enable more widespread distribution across the surface of the dough sheet. An alternate method is described in U.S. Pat. No. 4,608,264, issued Aug. 26, 1986 to Fan et al., which teaches washing the snack pieces in an oil/emulsifier mixture prior to frying.

The emulsifier system can also be applied to the surface of the dough making equipment to lower the surface tension and adhesive potential of the equipment surface. Aqueous or lipid diluted emulsifier systems can be applied by process means similar to those for application to the dough sheet surface. A method for applying emulsifier to the dough sheet surface is described in U.S. Pat. No. 4,567,051 (Baker et al., 1986) and is herein incorporated by reference.

5. Dough Preparation

The ingredient blend is combined with added water to form the dough when the ingredient blend comprises essentially dry flour components. The dough comprises from about 50% to about 80% flour blend and from about 20% to about 50% liquid component. Furthermore, the dough can comprise from about 0.01% to about 6% emulsifier based on the weight of the ingredient blend on a dry basis. The dough comprises from about 30% to about 60% total water that can be provided by either moisture inherently present within the materials, present from a wet pre-cooked starch-based material, from added water or any combinations thereof. Prior to combining dry ingredients with water and emulsifier to form a dough, it is advantageous to pre-blend the dry ingredients to obtain a homogenous composition.

Proper hydration is very important for achieving the right dough and final product properties. How the dough is mixed greatly impacts the hydration. Under mixing results in a random, uneven moisture distribution with dry flour interspersed through the dough. Over mixing can create too much swelling and water absorption of the pre-gelled starches leading to doughs that are tough and adhesive. The level of mixing is even more important in the making of nested tortilla chips since the level of water distribution affects how well the steam will be able to evaporate away from the constrained frying mold surfaces. When the dough is over mixed, a higher level of bound water results within the pre-gelled starches which will release water more slowly during frying. The delayed steam release can lead to less expansion because the dough surface viscosity increases before any significant expansion has occurred. The dough is unable to experience a rapid constant rate of dehydration early in the frying period that is critical to developing an expanded structure.

A wide variety of mixers can be used to mix the dough. The dough can be mixed in batches with a sigma or ribbon type blade design preferred such as those made by APV Baker of Grand Rapids, Mich. A planetary type of batch mixer can also be used. The length of mix time with these types of mixers is generally on the order of from about 3 to about 10 minutes and the blade revolutions per minute are relatively low at from about 10 to about 35 rpm. An alternate type of batch mixer with a higher production rate is a Universal Mixer made by the Stephan Machinery Co. Inc. of Columbus, Ohio, where a much larger batch of dough is mixed with a high speed propeller type mixer blade where such mixers and products resulting from such mixers can be referenced in U.S. Pat. No. 5,395,637 (Reece, 1995) and U.S. Pat. No. 5,401,522 (Reece, 1995). Continuous mixing is preferred for this development. Single or twin screw extruders can be used to mix the dough. Examples of these types of processes used for mixing can be found in U.S. Pat. No. 5,147,675 (Gage et al. 1992) and U.S. Pat. No. 4,778, 690 (Sadel, Jr. et al., 1988). A large auger type mixer where dough is continuously conveyed through an enclosed casing is another continuous mixing option where the speed of the mixing blade is higher and the dough residence time is lower than in a batch mixing operation. These types of mixers are made by the Exact Mixing Co. of Memphis, Tenn., APV Baker Inc. of Grand Rapids, Mich., and Paragon Wilson Co. of South San Francisco, Calif. Typical residence time for this type of mixer is on the order of from about 2 to about 4 minutes with a mixing blade speed of from about 100 to about 300 rpm. An especially preferred continuous mixing process for the current development is a Turbulizer Mixer® made by the Hosakawa-Bepex Co. Inc. of Minneapolis, Minn. where the dough becomes rapidly agglomerated while simultaneously experiencing a comminutive action that reduces the dough to a coarse, cohesive powder upon exit from the mixer. The water distribution into the mixer is ideally accomplished with one or more nozzles located near where the flour will feed the mixer.

It was surprisingly found that desired dough properties can be delivered by mixers of widely different geometric configurations by specifically controlling the level of work input and shear forces experienced by the dough. It was important that the dough generally move in a consistent direction in the mixer preferably moving radially from the shaft towards the mixer wall with minimal reverse flow. This allows consistent shear and working of the dough to occur. The energy consumed per mass of dough during the mixing cycle is one indicator relating to the proper mixing of the dough to achieve desired levels of starch hydration. The energy consumed by the mixer can be measured with a commercially available power meter such as a Model 4113 Power Harmonics Analyzer made by Fluke Co. Inc. The power consumption of mixer operating at target rates unloaded with dough is subtracted from the power consumption of a mixer loaded with dough operating at the same process conditions to derive the energy actually used to mix the dough independent of any inertial or mechanical losses generated by the mixing equipment. For example, the unloaded and loaded measurements should be taken while the mixer is operating at the same revolutions per minute (RPM). The energy to mass of dough ratio should be from about 0.7 to about 50 joules/g-dough, preferably from about 3 to about 45 joules/g-dough, more preferably from about 6 to about 40 joules/g-dough, and most preferably from about 14 to about 38 joules/g-dough. The shear mixing experience by the dough can be further characterized by the tip speed of the mixer, Froude number and shear mixing ratio which is the ratio of the blade surface area to the mixer wall surface area per unit of time. The tip speed can be determined by the diameter and rotational speed of the mixer and should be from about 200 feet per minute (FPM) to about 15,000 FPM, preferably from about 1000 FPM to about 12,000 FPM, and most preferably from about 2000 FPM to about 10,000 FPM. The Froude number is a dimensionless ratio of inertial to gravimetric forces experienced during mixing and relates to how well the dough is being moved towards the mixing zone at the shell of the mixer. Calculations for this parameter can be referenced in p. 320, *Food Processing Operations and Scale Up*, K. J. Valentas et al. (Marcel Dekker Inc., New York, N.Y., 1991). The Froude number is preferably greater than about 25, more preferably greater than about 150, and most preferably from about 160 to about 600. The shear mixing ratio provides an indication of how much time the dough is sheared between the mixer blade and wall. This can be calculated by measuring the total length of the blade that will face the mixer wall multiplied by the blade tip speed divided by the surface area of the mixer. If more than one blade is present in the mixer, then the length of all blades is cumulatively summed. The shear mixing ratio should be from about 100 to about 10,000 minutes$^{-1}$, preferably from about 800 to about 7000 minutes$^{-1}$, and most preferably from about 1000 to about 5000 minutes$^{-1}$. The blade surface area, mixer speed, and amount of dough loading in the mixer can be varied to achieve the desired power to mass and shear mixing ratios.

The dough is transformed into a thin continuous sheet after mixing. There are a variety of methods for sheeting available to one skilled in the art. The most common process involves passing the dough through the nip formed between a pair of similarly sized rolls rotating in opposite directions towards each other where the thickness of the sheet is controlled by the gap maintained between the rolls. The thickness of the dough is an important parameter that effects the final product quality, strength of the dough sheet, final product weight and subsequently package net weight, and length of frying time needed to evaporate the water from the dough. The sheet thickness of the dough should be from about 0.018 to about 0.07 inches, preferably from about 0.022 to about 0.055 inches, more preferably from about 0.025 to about 0.04 inches, and most preferably from about 0.026 to about 0.034 inches. The gap between the sheeting rolls can be adjusted to deliver the desired thickness.

A sheeting and gauging process can alternately be used where the dough is first made into a thick sheet by a first set of rolls then the sheet is passed subsequently between any number of roll pairs to sequentially reduce the sheet thickness with each set of rolls. Typically there are three to four pairs of rolls following the first sheeter rolls. Sheeting roll equipment capable of delivering the desired thickness for tortilla chip making can be referenced in U.S. Pat. No. 4,405,298 (Bain, 1983), U.S. Pat. No. 5,470,599 (Ruhe, 1995), U.S. Pat. No. 5,576,033 (Herrera, 1996), U.S. Pat. No. 5,580,583 (Cardis et al., 1996), U.S. Pat. No. 5,626,898 (Cardis et al. 1997), U.S. Pat. No. 5,635,235 (Sanchez et al., 1997), U.S. Pat. No. 5,673,609 (Sanchez et al., 1997), U.S. Pat. No. 5,720,990 (Lawrence et al., 1998), WO 95/05742 (Cardis et al., 1994), WO 95/05744 (Cardis et al., 1993).

The preferred milling process for this development is described in WO 95/07610 (Dawes et al., 1996). It was found during the course of this development that maintaining a specific range of roll temperatures resulted in an improved final product and sheeting capability. Mixing of dough capable of making a constrained fried tortilla chip with desirable surface bubble characteristics involves the release of free starches to promote starch bonding and dough tensile strength capable of holding expansion. The free starches can also adversely increase pressure sensitive adhesion properties of the dough sheet leading to adhesion to the mill rolls used to sheet the dough or other downstream pieces of equipment that the dough contacts. Pressure sensitive adhesion occurs when the dough is able to flow and wet the surface of a material with a much higher surface tension. As a dough is pressed the viscosity momentarily lessens and the dough flows across the sheeting roll surface. The combination of increased surface area contact and large differential surface tension with the sheeting rolls causes the dough to stick. Typically, sheeting rolls are made from stainless steel, which can have a surface tension of about several thousand dynes/cm$^2$ versus about several hundred dynes/cm$^2$ for dough that is at about 120° F. to about 140° F. Preferably the rolls used to sheet the dough are temperature controlled. Cooling the dough via the sheeting rolls can lessen both pressure sensitive adhesion mechanisms by acting as a thermal buffer that allows the bulk dough to flow, but increases the local dough surface viscosity thus lessening the amount of sheeting roll surface area contact. The cooler dough also has less surface tension differential to the sheeter rolls. The temperature of the dough sheet is ideally maintained to be less than about 120° F., preferably less than about 110° F., more preferably less than about 105° F., much more preferably from about 75° F. to about 105° F., and most preferably from about 85° F. to about 100° F. The surface temperature at any point of the back sheeting roll should be maintained at a temperature of from about 34° F. to about 80° F., more preferably from about 45° F. to about 70° F., most preferably from about 50° F. to about 65° F. The surface temperature at any point of the front sheeting roll should be maintained at a temperature of from about 85° F. to about 120° F., more preferably from about 90° F. to about 110° F., most preferably from about 90° F. to about 105° F. The rolls are preferably cooled by flowing a temperature controlled fluid through an open sheet or tubing within the interior of the rolls, preferably close to the underside of the roll surface. A number of fluids can be used to cool the rolls including water, glycol, glycerin, solutions containing salt such as a brine solution, commercially available thermal fluids, waxes, mineral oils, petroleum oils, naturally occurring oils from animal, vegetables or plants. The use of water and glycol are preferred embodiments for this development where glycol at a temperature of from about 3° F. to about 15° F., preferably from about 5° F. to about 10° F. is used to cool the back sheeting roll and water at from about 40° F. to about 90° F., preferably from about 55° F. to about 80° F. is used to control the temperature of the front sheeting roll.

Alternately, the sheeting rolls can be temperature controlled via external fluid contact such as by blowing a temperature controlled gas such as air at a high velocity across the roll surface or by continuously or intermittently coating the roll with a liquid where the liquid can be heated or cooled to provide the desired sheeting roll surface temperature. A further alternative process is to coat the rolls with an evaporative fluid such as ethanol and water where the latent heat of vaporization of the fluid takes energy away from the sheeting roll surface. All of the external temperature control alternatives are much less preferred since any of the fluid materials may come in contact with the product stream or create other operational issues such as transfer of the fluids to other equipment areas.

The dough can be cut into any number of two dimensional shapes after sheeting to the desired thickness. Suitable shapes can be formed by any combination of lines or curves. The projected shape of the dough piece can include but not be limited too parallelepipeds, polygons, circles, ovals, parabolas, ellipses, or sections of any thereof. Preferred shapes include squares, diamonds, rectangles, trapezoids, parallelograms, triangles, circles, ovals, bowties, stars, pin wheels or ellipses, more preferred shapes include ovals, circles, diamonds and triangles, and most preferred includes triangles. Optionally, the edges of any of the snack pieces can be curved to provide more surface area to facilitate gripping of the final snack piece or to add net weight.

The dough can be cut into pieces by a cutter roll contacting the front sheeter roll. The cutter roll can consist of raised fixtures in the desired shape of the dough piece attached to the surface of the cutter roll where the outline along the top outside edge of the fixture is raised such that an interference is created that cuts the dough when the raised outside edge contacts the surface of the sheeter roll. Processes utilizing cutting against a sheeter roll can be found in U.S. Pat. No. 4,348,166 (Fowler, 1982) and is herein incorporated by reference.

Alternately, the dough can be cut by a series of thin, sharp surfaces such as knives or rollers that are mechanically driven or cut against the direction of the dough momentum forces to create individual pieces. This type of process can be readily used to cut strips of dough, preferably shapes with parallel side, but is not as useful for curved or irregular shapes.

A third process option involves feeding the mixed dough between a pair of rolls where one roll has depressed cavities that are in the desired shape of the snack piece at a depth below the surface of the roll matching the desired dough thickness of the snack piece. The back roll typically is non-smooth containing either raised bars or cleats or cut grooves or depressed cut grooves running across the surface of the roll perpendicular to the direction of the dough that serve to catch and propel the dough to the nip formed between the front and back rolls. The dough is pressed into the shaped cavities to form the snack pieces which drop out of the cavities as the roll rotates to a lower position. This type of rotary molding process can be referenced in U.S. Pat. No. 4,586,888 (Anderson, 1986), U.S. Pat. No. 4,978,548 (Cope et al., 1990), and where a non-stick film is placed between the mold cavity and dough to reduce adhesion U.S. Pat. No. 5,683,734 (Israe, 1997) which are herein incorporated by reference.

A fourth process option is to cut the dough into a ribbon of partially cut shapes connected at each end to a neighboring dough piece of a preferably similar shape. The ribbon is pulled along by a series of belts of rollers to final transfer into a frying system. Dough ribbon cutting and transferring processes are described in U.S. Pat. No. 3,872,752 (Remde et al., 1975), U.S. Pat. No. 4,032,664 (Weiss et al., 1977), U.S. Pat. No. 4,126,706 (Hilton, 1978), and U.S. Pat. No. 4,567,051 (Baker et al., 1986) which are herein incorporated by reference.

The preferred cutting process for the present development is described in U.S. Pat. No. 3,520,248 (MacKendrick, 1970) and is herein incorporated by reference. The preferred process utilizes a separate cutting operation following sheeting where the sheet is passed between a pair of similarly sized rolls counter rotating towards one another, one being a cutter roll such as that described above. The second roll is a vacuum transfer roll that takes the cut dough piece out of the cutter cavity and rotates to a position above the lower half of a constrained frying mold and preferably blows said dough piece to deposit on the carrier mold half. An alternate process embodiment would be to cut the dough between two rolls containing intermeshing shearing cutters which can be referenced in U.S. Pat. No. 4,108,033 (Bembenek, 1978) which is herein incorporated by reference.

An alternate dough forming embodiment would be the use low shear, low pressure piston or forming extruder that would press the dough through a die or orifice plate cut to the desired shape. The shaped dough is then cut off the face of the die or orifice plate at the desired dough thickness. Equipment performing this function is manufactured by the Reading Pretzel Co. Inc. of Reading, Pa.

6. Dough Properties

Several dough properties are critical towards delivering acceptable sheeting performance, shaped chip formation capabilities, and desired tortilla texture attributes. The strength and extensibility of the dough sheet are two parameters that correlate strongly with the capability to form a continuous dough sheet and to form a shape without tearing or cracking. The tensile strength and extensibility can be measured by placing a cut strip of sheeted dough vertically between a pair of symmetrical clamping jaws within a texture analyzer capable of providing a constant stretch rate while measuring the force applied while pulling the dough apart. The dough will continue to be pulled apart until it breaks at which point the maximum force applied to the dough strip and maximum stretch distance prior to breakage are recorded. The tensile strength of the dough should be from about 75 grams-force ("g-force") to about 400 g-force, preferably from about 100 g-force to about 350 g-force, and most preferably from about 120 g-force to about 250 g-force. The extensibility of the dough should be greater than about 3 mm, preferably from about 4 mm to about 40 mm, more preferably from about 5 mm to about 30 mm, and most preferably from about 7 mm to about 20 mm.

The rate and level of hydration of each of the starch sources within the flour is critical to achieving a crisp expanded texture. If for example, the pre-gelled starches are over hydrated then the other native starches can be present as a dry powder that can interrupt the dough structure creating too many steam vent points leaving behind a less expanded chip. Over mixed pre-gelled starches can also release too much free starch making the sheeted dough more prone to pressure sensitive adhesion problems. Conversely, if the pre-gelled starches are not hydrated enough, then the dough will not develop sufficient tensile strength to hold expansion which also results in reduced expansion. The hydration properties of the dough were found to be critical to both the capability to form bubbles above the chip surface and the strength of the bubbles formed. Surface bubbles in snack chips are formed due to the simultaneous occurrence of two physical processes. The first is the presence of starch bonding at the chip surface of sufficient strength to stretch and sustain expansion without breaking or collapsing. The second is the ready evaporation of randomly dispersed free water droplets located below the surface of the starch structure. As the water evaporates, a bubble is formed and contained within the bonded starch matrix.

Starch can be present in snack chip doughs in varying levels of gelation from native, uncooked intact cells to fully gelatinized, swollen and broken apart with no intact cell walls. Water will reside in the dough as free or bound water where the water is chemically or physically bonded to the starch matrix. The presence of water is interactive with the starch and will continue to change the starch properties. Factors like the source of the starch, level of pre-treatment like cooking or grinding, level of starches, level of water, water addition procedures, and mixing procedures can all impact the hydration properties which include the continued swelling of the starch and levels of free vs. bound water. If too much free water is present and little interaction with the starch has occurred, little bubble formation will occur since inadequate starch cell bonding will be present. Conversely, if all of the water is bound, there will be no water available to promote bubble expansion at the chip surface.

With the large number of interactive independent variables, it is difficult to predict which dough compositions and which sets of dough making process conditions will promote stable, strong bubble formation.

The hydration and swelling properties of the starch can be correlated to the viscosity of the dough as measured by a capillary rheometer. A small sample of dough is prepared using lab scale equipment and fed via piston through a precision capillary tube of known geometry where the pressure drop across the orifice is measured. The viscosity between a shear rate of from about 5 to about 10 $sec^{-1}$ should be from about 5,000 pascal-seconds (pascal-s) to about 50,000 pascal-s, preferably from about 10,000 pascal-s to about 40,000 pascal-s and more preferably from about 15,000 pascal-s to about 30,000 pascal-s. The viscosity at a shear rate of about 100 $sec^{-1}$ should be from about 3,000 pascal-s to about 20,000 pascal-s, preferably from about 6,000 pascal-s to about 15,00 pascal-s and more preferably from about 7,000 pascal-s to about 10,000 pascal-s. The viscosity at a shear rate of about 1000 $sec^{-1}$ should be from about 200 pascal-s to about 7,000 pascal-s, preferably from about 1000 pascal-s to about 4,000 pascal-s and most preferably from about 1500 pascal-s to about 3,000 pascal-s.

Figure 8:
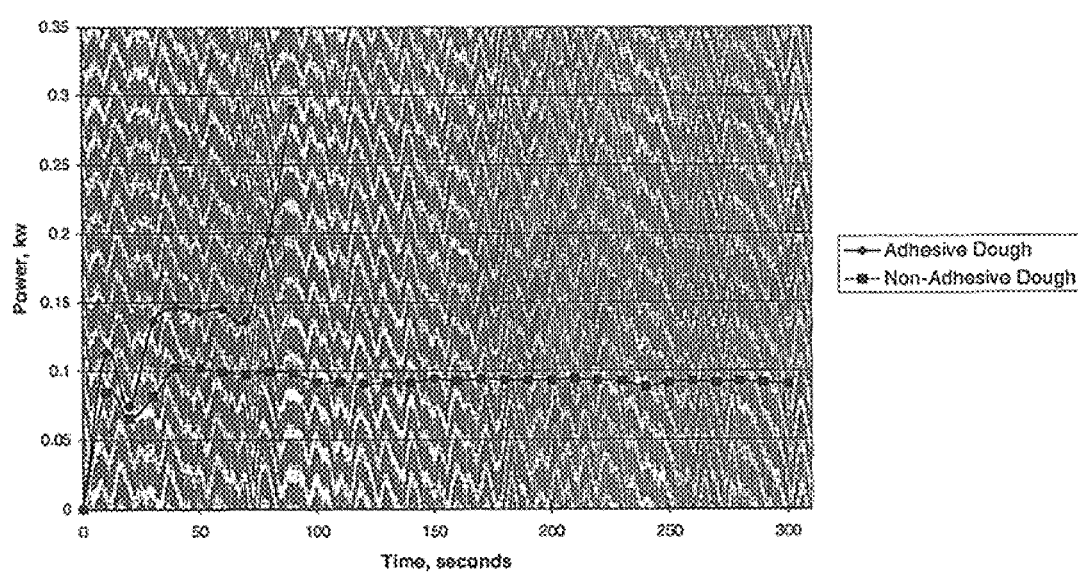
FIG. 8 Plot of Power Consumption During Adhesion Mixing Test

The adhesiveness of the dough can readily impact the reliability of the dough forming operations. Undesirable adhesion to dough forming equipment can limit the rate of production progressing to a complete shut down with neither situation economically desirable. It was found during the course of the present development that the adhesive properties of the dough can be determined by a convenient, bench top method that measures the power consumption during mixing at various formulation and process conditions. The dough is mixed in a food processor that is connected to a power meter. The effects on adhesion of varying the ingredients and their ratio within the ingredient blend, water level, and water temperature can be readily tested. The power consumed by the food processor mixer is monitored as the dough is mixing. A dough with minimal to no adhesive tendencies will show minimal to no increase in power consumption over the course of mixing or may even show a slight decrease in power consumption. Conversely, an adhesive dough will display a rapid increase in power consumption once the ingredient blend has become well hydrated. Preferably, the dough displays a plot of the power consumed during mixing versus time is essentially a flat line or a line with a slightly increasing or decreasing slope. It has been observed that an adhesive dough can agglomerate very quickly during the mixing test into a single large dough ball. When this agglomeration occurs, the test is stopped since the resistance to the food processor blade is greater than the power of the motor and mixing essentially stops. Preferably, the dough does not display this agglomeration tendency. The tendency of a dough to display adhesiveness can be ascertained by a Adhesion Power Consumption Factor that will be defined as the maximum rate of power increase at any time during the food processor mixing test. The power consumption factor is determined by calculating the slope of power consumption over a 30 second interval between any two time points during the test. The Adhesion Power Consumption Factor should be less than about $7\times10^{-3}$ kilowatts/second, preferably less than about $5\times10^{-3}$ kilowatts/second, more preferably less than about $2\times10^{-3}$ kilowatts/second, and much more preferably from about 0 to about $0.5\times10^{-3}$ kilowatts/second, and most preferably from about $-0.5\times10^{-3}$ kilowatts/second to about $0.5\times10^{-3}$ kilowatts/second. FIG. 8 shows a power consumption curve for a non-adhesive and an adhesive dough.

Alternately, the level of bound water in the sheeted dough can be measured by the dehydration rate of the dough under controlled drying conditions. The higher the level of bound water, the lower the rate of dehydration. The dehydration rate can be measured using an LJ16 Moisture Analyzer Type PJ300MB made by the Mettler Toledo Co. Inc. of Hightstown, N.J. The instrument is set up to print out the cumulative moisture lost from the sheeted dough every 30 seconds. The moisture loss results are converted to a grams of moisture per gram of dry solids basis and plotted vs. the length of the dehydration time once the total moisture content of the dough sheet is known at the end of the measurement. For example, if the starting sample weight is 5.0 grams and the final moisture of the dough is measured to be 35.0%, then the amount of water per amount of dry solids in the dough at the start of the measurement can be determined by $$g\text{-water}/g\text{-dry solids initial} = \frac{(\text{sample mass})(\%\ \text{final moisture}/100)}{(\text{sample mass})(1.00 - \%\ \text{final moisture}/100)}$$

The amount of water per dry solids at subsequent points along the dehydration curve can be calculated by $$g\text{-water}/g\text{-solids intermediate} = \frac{(\text{sample mass})(\%\ \text{final moisture}/100) - (\text{sample mass})(\text{intermediate }\%\ \text{moisture loss reading}/100)}{(\text{sample mass})(1.00 - \%\ \text{final moisture}/100)}$$

Figure 9:
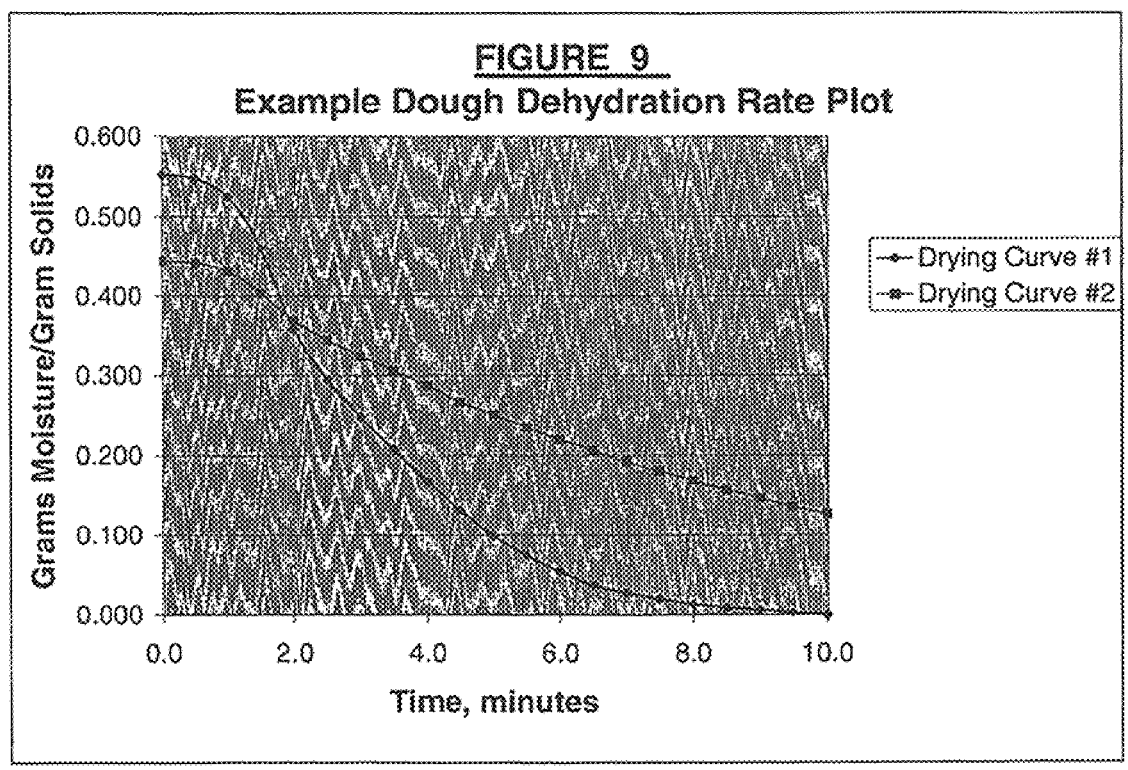
FIG. 9 Plot of Dough Dehydration Rate

FIG. 9 shows the plot of typical dehydration rate data for the present development expressed in a g-water/g-solids (grams-water/grams-solids) basis versus the drying time. In general, the shape of the plot is fairly linear between the about start of the measurement to about 5 minutes of drying. The slope of the line that connects the plotted data between the start at time 0 and the point at 5 minutes of drying should have a slope of from about $0.5\times10^{-2}$ g-water/g-solids-min to about $30.0\times10^{-2}$ g-water/g-solids-min, preferably from about $1.0\times10^{-2}$ to about $20.0\times10^{-2}$ g-water/g-solids-min, more preferably from about $3.5\times10^{-2}$ to about $15.0\times10^{-2}$ g-water/g-solids-min, and most preferably from about $6.0\times10^{-2}$ to about $10.0\times10^{-2}$ g-water/g-solids-min.

The viscosity of the sheeted dough can be measured via RVA to provide an indication of swelling potential. The degree of swelling potential for a given dough piece will be related to the level of work input received. In general, increased work input creates increased dough bonding that can limit the level of dough expansion that is possible. Increased viscosity levels correlate to higher swelling potential. The dough sheet is immediately frozen with liquid nitrogen after collection and kept frozen, preferably via a low temperature freezer that is below 0° F. and most preferably by storage in a chilled container with dry ice. The sample is hydrated to a controlled level at the time of measurement. The peak viscosity for the sheet dough should be from about 25 to about 850 cp, preferably from about 50 to about 700 cp, more preferably from about 100 to about 500 cp, and most preferably from about 125 to about 400 cp. The final viscosity of the sheeted dough should be from about 250 to about 2200 cp, preferably from about 400 to about 1800 cp, more preferably from about 500 to about 1600 cp, and most preferably from about 600 to about 1500 cp.

While the dough needs to have sufficient strength to enable feasible sheeting characteristics, it also needs to be flexible so that it can be formed into a precisely shaped final chip. The glass transition temperature of the dough, $T_g$, is an important measure that correlates to dough flexibility. In order to be flexible, a dough needs to maintain some fluid like properties so that it can flow around the shapes of the constrained frying mold system without having the surface become interrupted. The glass transition point of a given material is an indicator of where the material begins to demonstrate flow where or alternately where a plastic, flexible material is beginning to acquire more solid like behavior. The glass transition temperature is an indicator of where this change in material properties begins. In general, the higher $T_g$ is inversely related to dough flexibility. The $T_g$ can be measured using a dynamic mechanical analyzer (DMA) where a small piece of dough sample is subjected to a controlled mechanical strain and temperature profile such that the temperature at which the dough begins to exhibit flow behavior as a result of the strain can be measured. In order to retain a flexible dough sheet the $T_g$ should be less than about 100° F., preferably from about 0° F. to about 70° F., more preferably from about 20° F. to about 55° F., still more preferably from about 35° F. to about 45° F., and most preferably from about 36° F. to about 42° F.

C. Frying

After the snack pieces are formed, they are cooked until crisp. The snack pieces can be cooked by frying, by partially frying and then baking, by partially baking then frying, by baking, or by any other suitable method. The snack pieces can be fried in a fat composition comprising digestible fat, non-digestible fat, or mixtures thereof. A preferred embodiment of the present development is the capability to generate a snack piece with raised surface features such a the bubbly surface of a tortilla style chip without the need for the traditional baking step prior to frying. The baking step is defined as the application of heat to the dough separate from frying by single or multiple unit operations, such as an oven, that impart substantial heat to the dough by means such as direct fired gas jets or burners, forced convection heating, radiation, conduction from conveying surfaces such as belts or any combinations thereof. References for making of tortilla chips via traditional methods have been previously cited and are again referenced for further description of the baking process.

A snack chip with a more pre-defined and more controlled shape than can be formed via random frying can be accomplished by a variety of methods. One method described in U.S. Pat. No. 4,650,687 (Willard et al., 1987) discloses a technique where dough pieces of a specific size range are docked in such a way that the steam pressure from the less docked regions causes the dough piece to curl in a more predictable orientation when fried in a shallow oil depth. An alternative approach is disclosed in WO 00/08950 (Fink et al.,2000) where the dough is placed unconstrained on a single, lower mold with a mold and dough piece shape capable of holding a fluid for sufficient time that when the fluid is hot such as at frying oil temperatures of from about 340° F. to about 405° F., the dough piece can cook on the inside surface. The lower surface of the dough piece is then cooked by adding hot oil to fill the lower region of the mold or by optionally transferring the partially cooked snack piece randomly through a reservoir containing hot oil. The problem with both of the methods described above is that the resulting final fried snack piece dimensions can be highly random, too random to enable good nesting of the pieces or attainment of higher bulk package densities that are typical with nested snack pieces. The process of steam leaving the chip surface has a violent action that minimally deforms and distorts the periphery edge of the snack piece. Further, the diffusional restrictions within the dough matrix that restrict the transport of steam away from the dough often results in a pulsed steam release behavior that generates a wave motion response across the dough piece during frying. The snack piece randomly expands and contracts. The final product shapes have variable length to width aspect ratios.

Preferably the dough piece is more restrained to make final chips capable of high bulk package densities. The dough cut into the desired shape can be constrained by a pair of intermeshing belts or moveable frames wherein the dough piece sits between the belts and takes the shape of the belt contours. Ideally the continuous belts have similar surface contours or shapes in geometrically similar locations such that the belts can come together at close tolerance to hold the dough piece in place. A process where the dough is constrained between a belt and rotating wheel is disclosed in U.S. Pat. No. 3,905,285 (Campbell et al., 1975) and U.S. Pat. No. 3,935,322 (Weiss et al., 1976). A preferred variation is to have a single belt or single set of movable frames or molds where the top of the dough piece rests against the bottom of the belt, frames or molds and the dough piece either floats by buoyancy to remain in a fixed location or is preferably supported by the convective currents of frying oil directed towards it. The constraining materials for the molds or belts are ideally perforated to allow evaporated moisture from the dough to escape to the frying oil thus maintaining a driving force for mass transfer to continue. A disadvantage with types of process is that the level of restraint does not prevent the dough from moving at odd positions to the restraints to form folded or deformed chips. The linear rate of the process is inhibited by the potential loss of dough piece registration with the constrained forming system.

Preferably, the snack pieces are fried by a continuous frying method. The snacks can be constrained during frying in an apparatus as described in U.S. Pat. No. 3,626,466 (Liepa, 1971). The snack pieces of the current invention can are most preferentially formed into a fixed, constant shape by cooking the dough pieces between a pair of constrained molds that hold the dough in its shape until the structure is set. The shape of the constrained molds can be modified to deliver the desired shapes of the present development. Prior to immersion in the frying oil, the dough pieces can began to experience film frying via residual oil and heat remaining on the constrained frying molds.

The dough pieces are cut from the sheet, shaped using a movable, apertured mold half to shape the cut dough pieces and then held during subsequent frying by a second apertured mold half. The dough can be fried to set the final structure to the desired shape. A reservoir containing a frying medium is used. The shaped, constrained pieces are passed through the frying medium until the chip shape is set and the chips are crisp.

The chips have a final moisture content as measured by drying in a vacuum oven of less than about 6%, preferably from about 0.4% to about 3%, more preferably from about 0.6% to about 2.5%, and most preferably from about 0.8% to about 2%. The total fat content (digestible plus non-digestible fat) of the finished snack piece should be from about 18% to about 40%, preferably from about 22% to about 34%, more preferably from about 24% to about 30%, and most preferably from about 25% to about 29%.

The shapes of the restrained cooking molds or belts are preferably sections of a sphere, cylinder, paraboloid, hyperbolic paraboloid or ellipsoid, more preferably sections of a sphere. It was found in the course of this development that the design of the constrained frying molds or belts was critical towards enabling a sufficient rate of steam release to deliver the desired tortilla chip texture and appearance attributes. Three parameters are important for the constraining material that comes in contact with the dough surface and these include the gap between one constraining surface being used to shape the dough and free flowing oil being used to cook the dough piece, the size of the holes in the constraining material, and the level of areas occupied by holes or open area of the constraining material. The gap control allows expansion and enables sufficient oil contact with the dough. The hole size and open area directly govern the steam transfer rate by the amount of resistance to flow that occurs. Incorrect sizing of these parameters makes it difficult to impossible to deliver a tortilla chip texture with expanded random bubbles populating the surface of the chip.

The dough pieces obtain a substantially uniform shape by contact with at least one molding surface during the frying process until the dough becomes rigid enough to holds its form. Preferably the movement of the dough piece is restrained where a gap between at least one molding surface and a constraint is at least about 0.060 inches.

A preferred embodiment for the present development is the use of two apertured cooking molds to form a constrained region consisting of a top and bottom that have a gap measured between the lower surface of the upper mold and upper surface of the lower mold of greater than about 0.06 inches, preferably greater than about 0.1 inches, more preferably from about 0.1 to about 0.2 inches, and most preferably from about 0.1 to about 0.14 inches.

Preferably the forming molds are perforated where the molds come into contact with the dough. The hole size in any direction of the material used to constrain the dough should be greater than about 0.1 inches, preferably from about 0.12 to about 0.38 inches, more preferably from about 0.12 to about 0.25 inches, and most preferably from about 0.12 to about 0.19 inches. The percent open area of the constraining material should be greater than about 35%, preferably from about 40% to about 60%, and most preferably from about 40% to about 50%.

Preferably, the constrained frying molds or belts are hot before dough placement. The hot surface can provide some early heat to enable dough expansion. Preferably the constrained frying surface is greater than about 100° F., more preferably greater than about 200° F., and still more preferably from about 225° F. to about 420° F., and most preferably from about 325° F. to about 400° F.

The snack pieces are preferably fried at temperatures of from about 275° F. (135° C.) to about 450° F. (232° C.), preferably from about 300° F. (149° C.) to about 410° F. (210° C.), and more preferably from about 350° F. (177° C.) to about 400° F. (204° C.) for a time sufficient to form a product having about 6% or less moisture. The exact frying time is controlled by the temperature of the frying fat and the starting water content of the dough.

The presence of water on the surface of the dough prior to frying was found to impact product expansion. The dough typically enters the fryer at a cooler temperature than the temperature of the head space atmosphere above the frying oil. Typically the dough temperature is from about 80° F. to about 120° F. while the head space is closer to the frying oil temperature at from about 250° F. to about 350° F. Steam contained within the fryer atmosphere can condense on the product surface. The presence of this surface moisture in combination with the increased temperature of the dough as it enters the fryer atmosphere and frying oil leads to increased levels of surface starch gelatinization very quickly upon frying. The increased bonding that occurs at the surface can unpredictably impact product expansion. For example, a high level of condensed water on the surface can lead to a decreased level of expansion while a lower level of surface water can lead to increased expansion. It would be desirable to optimize the level of surface water to provide a level of expansion leading to a desirable final product texture. The atmosphere above the frying oil at the point before the dough enters the frying oil should contain an absolute humidity of less than about 1000 grains-moisture/$m^3$ of head space, preferably less than about 700 grains-moisture/$m^3$ of head space, more preferably from about 100 to about 650 grains-moisture/$m^3$ of head space. The absolute humidity of the fryer can be controlled by evacuating the fryer head space with exhaust blowers and replacing the removed atmosphere with an inert gas such as nitrogen. Applying a light coating of oil to the surface of the dough before the dough enters the frying oil, preferably on or before entry into the fryer atmosphere head space was surprisingly found to aid final product expansion potentially by acting as a barrier to water contact with dough surface starch. Any animal or vegetable oil can be used from the list of frying oils mentioned previously with the preferred source of the oil being the same as that used to fry the chips. The oil is preferably hot in the from about 350 to about 420° F. range (preferably from about 350 to about 420° F.). The oil can be applied to the chip via a variety of methods including sprays atomized or non-atomized, coatings, or streams with the preferred process being spray from a nozzle. The ratio of the weight of the oil added per weight of dough should be from about 0.1 to about 15, preferably from about 0.5 to about 10, more preferably from about 1 to about 5, and most preferably from about 2 to about 4.

If a higher fat level is desired in the snack product to further improve the flavor or lubricity of the snack, an oil, such as a triglyceride oil, can be sprayed onto the snack product when it emerges from the fryer, or when it is removed from the mold used in constrained frying. Preferably, the triglyceride oils applied have an iodine value greater than about 75, and most preferably above about 90. The oil can be used to increase the fat content of the snack to as high as 45% total fat. Thus, a snack product having various fat contents can be made using this additional step.

Triglyceride oils with characteristic flavor or highly unsaturated oils can be sprayed, tumbled or otherwise applied onto the snack product. Preferably triglyceride oils and non-digestible fats are used as a carrier to disperse flavors and are added topically to the snack product. These include, but are not limited to, butter flavored oils, natural or artificial flavored oils, herb oils, and oils with potato, garlic, or onion flavors added. This allows the introduction of a variety of flavors without having the flavor undergo browning reactions during the frying. This method can be used to introduce oils which would ordinarily undergo polymerization or oxidation during the heating necessary to fry the snacks.

If desired, the snack pieces can be fried and then heated with hot air, superheated steam, or inert gas to lower the moisture to about 3% or less. This is a combined frying/baking step. Oil can also be applied to the snack after baking if a baking step is also used.

In one embodiment of the present invention, the snack is fried in a blend of non-digestible fat and digestible fat. Preferably, the blend comprises from about 50% to about 90% non-digestible fat and from about 10% to about 50% digestible fat, and more preferably from about 70% to about 85% non-digestible fat and from about 15% to about 30% digestible fat.

Other ingredients known in the art can also be added to the fats, including antioxidants such as TBHQ, tocopherols, ascorbic acid, chelating agents such as citric acid, and anti-foaming agents such as dimethylpolysiloxane.

D. Finished Chip Characteristics

Snack chips with a desirable, stable, dichotomous surface appearance and texture are the objects of the present invention. In a class of snacks such as tortilla chips, the texture is made more interesting by having structures of alternating hardness and density within a cross section of chip area.

Preferably the weight of the final snack pieces is from about 0.5 to about 15 grams, more preferably from about 1.5 to about 10 grams, still more preferably from about 1.7 to about 6 grams, and most preferably from about 2 to about 3 grams.

Bubbles interrupting the plane of the snack piece surface are predominant features of a tortilla style snack chip. The surface of the snack chips is randomly populated by bubbles breaking through and resting above the surface of the chips. The size and frequency of the bubbles are the primary characterizing measures of the surface appearance.

The chip surface should consist of randomly dispersed, raised surface features on both sides of the snack piece that are essentially disconnected, where the maximum size and height of the raised surface features is restricted. The presence of these raised surface features adjacent to alternating, thinner regions within the snack piece provides the desired crisp, dichotomous texture.

Preferred embodiments of the current development include raised surface features that are in the form of bubbles or blisters having an essentially round or elliptical shape. The surface features can be characterized in reference to their maximum dimension (maximum diameter). Large surface features are those defined as having a maximum dimension greater than about 8.0 mm, medium surface features those having a maximum dimension of from about 5.0 mm to about 7.9 mm, and small surface features are those having a maximum dimension of from about 2.0 mm to about 4.9 mm.

In a preferred embodiment, large surface features occupy from about 12% to about 40% the total surface features present on the snack piece, preferably from about 15% to about 35%, more preferably from about 18% to about 30%, and most preferably from about 20% to about 27%; medium surface features occupy from about 20% to about 40% the total surface features present on the snack piece, preferably from about 23% to about 36%, more preferably from about 25% to about 32%, and most preferably from about 28% to about 31%; and small surface features occupy from about 25% to about 60% the total surface features present on the snack piece, preferably from about 30% to about 56%, more preferably from about 35% to about 50%, and most preferably from about 40% to about 48%. The amount of surface features on the snack piece should be from about 5 to about 35 per gram of chip, preferably from about 9 to about 31 per gram of chip, more preferably from about 11 to about 20 per gram of chip, and most preferably from about 11 to about 16 per gram of chip.

The raised surface features of the snack chip can be characterized by laser profilometry where a laser beam passing over the surface of the chip detects and records minute changes in the height of the chip. The instrument provides data on surface area density which is a ratio of the surface area of the snack chip to the total volume it occupies, the fractal texture which relates to predominant dimension of changes in the surface texture, and roughness which measures the height variation across the surface.

FIG. 1 shows an image generated from the surface of a snack chip from the present development. The surface area density should be from about 0.04 to about 0.10 $mm^{-1}$, preferably from about 0.05 to about 0.08 $mm^{-1}$, and most preferably from about 0.06 to about 0.07 $mm^{-1}$. The fractal texture should be from about 0.07 to about 0.4, preferably from about 0.1 to about 0.3, and most preferably from about 0.15 to about 0.3. The surface roughness should be from about 1.5 to about 7 mm, preferably from about 2.5 to about 6 mm, and most preferably between about 4 to about 5.7 mm.

The surface size and surface features of the snack chip are measured in accordance with the procedure described below in the Analytical Methods.

The preferred snack piece can also be characterized by several chip thickness measures. The average chip thickness should be less than about 3 mm, preferably less than about 2.5 mm, more preferably less than about 2 mm, and even more preferably from about 1 mm to about 2 mm, still more preferably from about 1.5 mm to 2 mm, and most preferably from about 1.75 mm to about 2 mm.

The average thickness at chip locations containing raised surface features should be from about 2.3 mm to about 3.2 mm, preferably from about 2.4 mm to about 3 mm, and more preferably from about 2.5 mm to about 2.9 mm. The maximum thickness at chip locations containing surface features should be less than about 5.5 mm, preferably less than about 5 mm, more preferably from about 3 mm to about 4.7 mm, and most preferably from about 3 mm to about 4 mm.

The coefficient of variation ("CV") of the entire snack piece thickness can be used as an indicator of the random nature of the surface features and as an indicator of a crisp, dichotomous texture. The CV is calculated by dividing the standard deviation of the chip thickness by the mean chip thickness and multiplying by 100%. The CV for chip thickness should be greater than about 15%, preferably greater than about 25%, more preferably greater than about 35%, and most preferably greater than about 40%.

Surprisingly, differences in bubble strength integrity were observed as a function of formulation and product making conditions. Bubble strength integrity will be defined as the property of bubbles breaking through or residing on the surface of snack chips to remain intact when subjected to normal or abrasion forces as might be encountered during transport of the chips. Interestingly, snack chips made with the same formula, can display large differences in bubble strength integrity depending upon the process conditions used to form the bubbles. Alternately, certain compositions were seen to promote bubble strength integrity.

An advantage of the current invention is that stable uniform bubble strength is provided over a wide range of snack chip thickness and hardness. This provides freedom towards tailoring the desired level of crispness and crunchiness by controlling the amount of surface bubbling, hardness of the base chip material, and the thickness that will be fractured during chewing.

The wall thickness of the surface bubbles themselves, independent of the base chip plane, is important to both the texture of the chip and to the capability of the surface feature to resist breakage. Thicker bubble walls are desirable to provide increased strength to withstand the normal and abrasive shear forces that will be experienced by placing the snack piece in a nested arrangement. Making the bubble walls too thick though can have a deleterious effect on the crisp texture. The bubble wall thickness can be measured by creating a scanning electron photograph, herein referred to as a micrograph, of the interior chip structure. FIGS. 2 through 6 show micrographs illustrating the interior structure and void features from snack chips of the present development. The observed bubbles reside above the plain surface of the chip with a void space beneath the bubble structure. The wall thickness of the bubble is defined as the distance between the top of the bubble structure at the chip external surface to the beginning of the void space beneath the surface of the chip along a constant linear axis running from the surface to the void region. The wall thickness of the bubble is ideally greater than about 0.1 mm, preferably greater than about 0.16 mm, more preferably from about 0.2 to about 0.7 mm, still more preferably from about 0.22 to about 0.5 mm and most preferably from about 0.22 to about 0.5 mm.

The strength of the bubbles can be assessed by a worst case laboratory vibration test where the snack chips are arranged in a vertical, nested stack such that geometrically similar points of each chip are aligned along the same vertical axis running perpendicularly through the face of each chip. Snack chips with initially unbroken, intact surface features are selected for the test, the level of bubble breakage can be defined by the number of broken bubbles per weight of chip. The level of breakage should be less than about 2.5 g-$chip^{-1}$, preferably less than about 2.0 g-$chip^{-1}$, more preferably less than about 1.75 g-$chip^{-1}$, and much more preferably less than about 1.5 g-$chip^{-1}$, and most preferably less than about 0.5 g-$chip^{-1}$. Alternately the level of intact surface features can be expressed on a percentage basis where the level of intact surface features is greater than about 75%, preferably greater than about 85%, more preferably greater than about 90%, and most preferably greater than about 95%.

The amount of interior void regions is another parameter of interest to delivering desirable tortilla chip texture. The amount of void spaces relative to the total solid mass of the chip can be characterized by X-ray tomography where this method determines the density of each region within the chip by the intensity of X-rays that can pass through the chip. The X-ray tomography results can be expressed as a ratio of the volume of the solids present within a snack chip contacted by the x-rays to the total volume occupied by the snack chip. The volume is derived from the x-rays defining the surface outline of the snack chip when solid surface regions are contacted. Similarly, the method can be used to define the ratio of the snack piece surface area to the volume of the solids. FIG. 10 shows an x-ray cross sectional image of a snack chip made by the present development. The percent of total volume occupied by the solids should be greater than about 45%, preferably from about 50 to about 70%, and most preferably from about 55 to about 65%. The ratio between the surface area of the snack piece to the total solids volume should be from about 0.04 to about 0.130 $mm^{-1}$, preferably from about 0.05 to about 0.100 $mm^{-1}$, more preferably from about 0.06 to about 0.09 $mm^{-1}$, and most preferably from about 0.06 to about 0.075 $mm^{-1}$.

The interior voids within the snack chip can also be characterized by the length and height breadth of the interior of a bubble region. The breadth of a bubble region is defined as the maximum length and height parallel to the respective horizontal or vertical axis. The bubble regions can again be viewed by scanning electron microscopy micrographs. The length of the interior bubble, void regions should be from about 1 to about 12 mm, with an average length of from about 2 to about 8 mm, preferably an average length from about 3.5 to about 6.2 mm, and most preferably an average length of from about 4.0 to about 5.5 mm. The height of the interior bubble void regions should be from about 0.20 to about 2.5 mm, with an average height from about 0.60 to about 1.90 mm, preferably an average height from about 0.90 to about 1.60 mm, and most preferably an average height from about 1.10 to about 1.45 mm.

The relationship between the final moisture content of the snack piece and the relative humidity contained within the snack piece has a large effect on the final eating texture. The product relative humidity is typically referred to as the water activity, $A_w$, and is a measure of the free water that is not bound by the snack matrix composition. The $A_w$ relates directly to the crispness of the snack chip and can be effected by compositional parameters such as level of starches, state of the starch, level of sugars, and final moisture content. The water activity is typically expressed as a function of the moisture content of the snack chip and often can be related as a linear correlation where water activity is the dependent variable and moisture content is the independent variable. The water activity can also be expressed as a % relative humidity for the snack piece (% RH) and can be derived by multiplying the measured water activity by 100%. The intercept for such a correlation should be from about −4 to about −20% RH, preferably from about −5 to about −16% RH, and most preferably from about −10 to about −16% RH. The slope for such a correlation expressed as a ratio of each % RH unit change per % moisture in the final product should be from about 5 to about 15, preferably from about 7 to about 12, and most preferably from about 9 to about 12.

Figure 11:
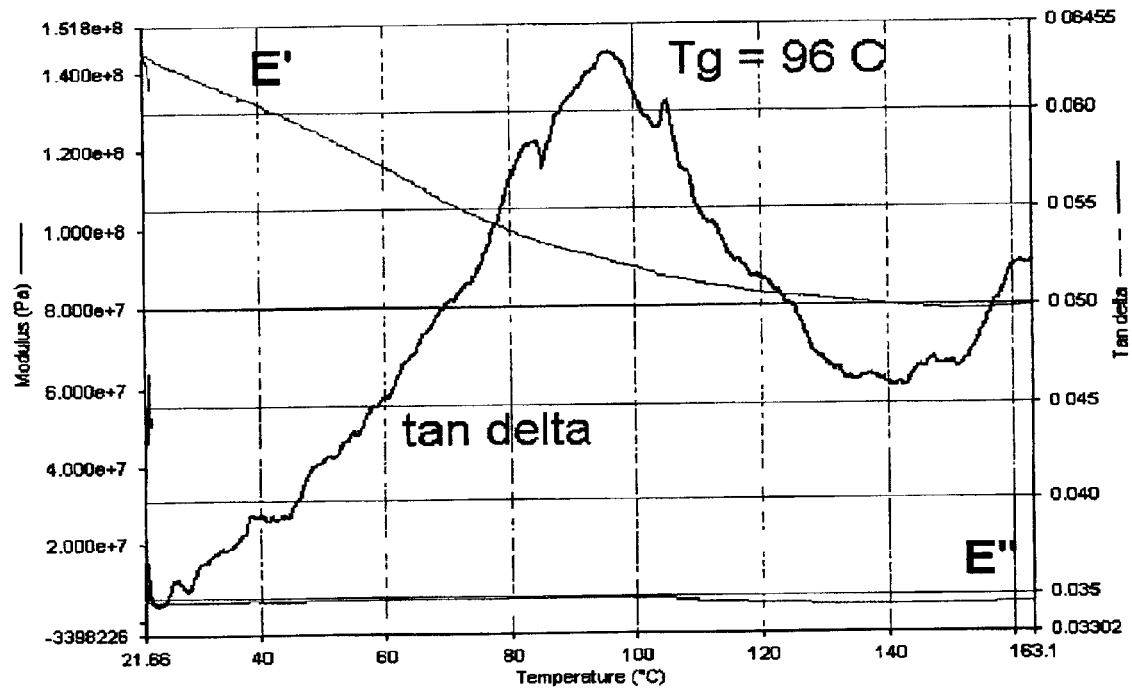
FIG. 11 Example Thermal Event Plot for Chip Glass Transition Temperature Determination

A further measure of the snack piece crispness is the glass transition temperature ($T_g$) taken on the final, cooked snack chip. It is important to control $T_g$ since too high of a transition temperature leads to a hard, glassy texture while a low value corresponds to a soggy texture. It is best to measure $T_g$ for a product equilibrated to a known water activity at a constant reference temperature. The glass transition temperature can be measured using a dynamic mechanical analyzer (DMA) where a known load force is repetitively applied to the chip surface during a controlled temperature ramp. The storage and loss modulus changes that occur are recorded and used to determine the glass transition temperature. FIG. 11 shows an example of a plot of the storage and loss modulus versus temperature and the correct shape of the curve used to calculate $T_g$. At relatively low snack relative humidity from about 2 to about 4% the glass transition temperature should be from about 165 to about 275° F., preferably from about 180 to about 250° F., and most preferably from about 195 to about 240° F. At relatively intermediate snack relative humidity from about 6 to about 9%, the glass transition temperature should be from about 180 to about 275° F., preferably from about 220 to about 250° F., and most preferably from about 230 to about 245° F. At relatively high snack relative humidity from about 20 to about 30%, the glass transition temperature should be from about 150 to about 235° F., preferably from about 180 to about 225° F., and most preferably from about 190 to about 215° F.

ANALITICAL METHODS

Parameters used to characterize elements of the present invention are quantified by particular analytical methods. These methods are described in detail as follows:

1. Fat Content

The method used to measure total fat content (both digestible and non-digestible) of the snack product herein is AOAC 935.39 (1997).

Digestible Fat Content

Digestible lipid (NLEA) method AOAC PVM 4:1995 is used to determine the digestible fat content of the snack product herein.

Non-Digestible Fat Content

Non-Digestible Fat Content=Total Fat Content−Digestible Fat Content

2. Moisture Content

Reagents

A. For Cleaning of Tins

Mr. Clean®—Or any other equivalent heavy duty liquid detergent containing no inorganic builders Cleanser—Comet® or equivalent B. For Drying Air Refill Kits for Gas Purifier—Alltech Assoc., #8132

Drierite Desiccant, indicating & non-indicating

C. For Vacuum Pump

Oil—Welch Duo-Seal

Sand—Standard Ottawa. )Dry at 105° C. overnight before using. Store in sealed container.)

Apparatus

Oven, Forced Air Hotpack Model 1303, or equivalent, capable of maintaining a temperature at ±2° C.

Oven, Vacuum—Fisher Model 281, capable of maintaining a temperature at ±2° C.

Balance, Analytical—200 g capacity, ±0.0004 g precision; check with standard weights semiannually Tins, Aluminum—Large, 75×20 cm; Small, 50×15 cm Gas Purifier—Alltech Assoc. #8121, 120 cc capacity, ⅛" fittings Laboratory Gas Drying Unit—2⅝"×11⅜" Acrylic Unit, A. H. Thomas, #5610-010

Drierite® dessicant, or equivalent

Bottle Gas Washing Drechsel, 500 mL capacity, CMS #123-984

Check Valve—CMS, #237-552

Iced Tea Spoon

Vacuum Pump—Welch Duo-Seal, or equivalent

Desiccator, Cabinet-Type—Boekel Model 4434-K

Reference Standard

A reference standard, barium chloride dihydrate, is run with each group of samples. A reference standard is run for each type of oven used and for each time/temperature combination used. The results from the reference standard for each combination are separately compared to the known value for the reference standard. If the result on the reference standard is equal to or within ±2σ of the known value, then the equipment, reagents and operations are performing satisfactorily.

Sample Preparation

Select a representative sample, weighing 5–25 g.

Operation

A. Preparation of Tins

1. Thoroughly clean the tin with water and liquid detergent. Scour with cleanser if necessary.

2. Dry the tins at 130° C. for at least 30 minutes.

3. Cool to room temperature. Keep the tins clean and dry until used.

B. Sample Weighing

1. Tins and samples must be at room temperature when weighed.
2. Weigh the tin and lid to ±0.0004 g and record as tare weight. If sand is used, include in tare weight.
3. Record weight of sample to ±0.0004 g and record as gross weight. Cover the tin and sample.
4. After heating, weigh the dried sample and tin with lid. Record this weight as the final dried weight.

C. Air Oven (Note: High moisture samples limits the number of samples that can be put into an oven.)

1. Set the oven to 105° C. ±2° C.
2. Remove tin cover and place on the bottom of the tin.
3. Place the tin and sample in the oven as quickly as possible to minimize the oven temperature drop. The oven shelves may be used to place and remove large numbers of samples rapidly. Use suitable gloves to prevent burns.
4. Start timing of samples from the time when the desired temperature is reached.
5. Remove the tin and sample and replace cover quickly after heating for 4 hours
6. Place the covered tins in a desiccator until cooled to room temperature. Then weigh to determine moisture loss.
7. Weigh the tin and dried sample to 0.0004 g and record as final dried weight. (Hold the tin and dried sample until the result is calculated. If the result is questionable, reweigh the tin and dried sample, or the cleaned and dried tin.)

D. Vacuum Oven

1. Set temperature dial for Fisher oven to 70° C.±2° C.
2. Close the dry gas (purge) inlet valve and vacuum line to the pump.
3. Place the sample and tin in the oven with the cover on the bottom of the tin.
4. Close door and start vacuum pump.
5. When 28" to 30" Hg is indicated on the vacuum gauge, open dry gas (purge) inlet valve and adjust to 70–90 bubbles/minute flow through the vacuum pump oil in the flow indicator bottle. Maintain a vacuum of 28" to 30" of Hg.
6. Start timing of sample from the time when the desired temperature is reached.
7. After heating for 20 hours, close the valve to the vacuum pump and stop the pump.
8. Slowly bleed the oven chamber to atmospheric pressure. (Prevent pump oil from the flow indicator bottle from being carried into the oven.)
9. Cover the tin and place in a desiccator until cool. Reweigh to ±0.0004 and record (Final Weight).

Calculations

Sample Weight=Gross Weight−Tare Weight

Final Weight=Recorded Weight from Step 9 above $$\% \text{ Oven Volatiles} = \frac{\text{Gross Weight} - \text{Final Weight}}{\text{Sample Weight}} \times 100$$

% Solids=100%−% Oven Volatiles

3. Surface Size And Surface Features

The surface size and relevant surface features can be measured by making a clear plastic or acetate template the same size and shape of the snack piece surface. The template is marked with a measurement grid, preferably in increments of 2 mm to 5 mm for each grid line. The template is superimposed upon the surface of the snack piece and the maximum dimensions of all surface features are characterized. The surface features are visibly recognizable as bubble or blister surfaces rising above the base surface of the snack piece creating a localized elevation surrounded by the lower base regions. Preferably, the raised surface features are marked with colored pen to enable more ready measurement of their size with the template. At least 15 snack pieces should be measured.

4. Snack Piece Thickness

The average snack piece thickness can be characterized by successive local measurements over the surface where a digital caliper is used to take 10 random measurements of the total thickness of raised surface features where each surface feature is measured only once and to take 10 measurements of the base snack chip surface that lie in between the raised surfaces. The caliper jaws contact the snack piece with one jaw on top of the surface feature and the other jaw contacting the underside of the opposite side of the snack piece just below the location of the surface feature. Between 5–10 snack pieces should be measured for thickness in this way to provide a total of between 100–200 data points. The average thickness can be taken across all the measurements for the base and surface features.

5. Water Absorption Index (WAI)

Dry ingredients and flour blend:

In general, the terms "Water Absorption Index" and "WAI" refer to the measurement of the water-holding capacity of a carbohydrate based material as a result of a cooking process. (See e.g. R. A. Anderson et al., *Gelatinization of Corn Grits By Roll- and Extrusion-Cooking,* 14(1):4 CEREAL SCIENCE TODAY (1969).)

The WAI for a sample is determined by the following procedure:

(1) The weight to two decimal places of an empty centrifuge tube is determined.
(2) Two grams of dry sample are placed into the tube. If a product is being tested, the particle size is first reduced by grinding the product in a coffee grinder until the pieces sift through a US # 40 sieve. The ground sample (2 g) is then added to the tube.
(3) Thirty milliliters of water are added to the tube.
(4) The water and sample are stirred vigorously to insure no dry lumps remain.
(5) The tube is placed in a 86° F. (30° C.) water bath for 30 minutes, repeating the stirring procedure at 10 and 20 minutes.
(6) The tube is then centrifuged for 15 minutes at a gravitational force of 1257 g. This can be accomplished by using a centrifuge model 4235 made by DiRuscio Associates of Manchester, Missouri at a speed of 3,000 rpm.
(7) The water is then decanted from the tube, leaving a gel behind.

(8) The tube and contents are weighed.

(9) The WAI is calculated by dividing the weight of the resulting gel by the weight of the dry sample:

WAI=([weight of tube and gel]−[weight of tube])÷[weight of dry sample])

6. Rheological Properties Using the Rapid Visco Analyzer (RVA)

The rheological properties of the ingredient blend, dry ingredients, flour blends, half-products and finished products are measured using the Rapid Visco Analyzer (RVA) model RVA-4. The RVA was originally developed to rapidly measure α-amylase activity in sprouted wheat. This viscometer characterizes the starch quality during heating and cooling while stirring the starch sample. The Rapid Visco Analyzer (RVA) is used to directly measure the viscous properties of the starches, and flours. The tool requires about 2 to 4 g of sample and about 25 grams of water.

For best results, sample weights and the water added should be corrected for the sample moisture content, to give a constant dry weight. The moisture basis normally used is 14% as is, and correction tables are available from Newport Scientific. The correction formulae for 14% moisture basis are:

$$M2 = (100-14) \times M1/(100-W1)$$

$$W2 = 25.0 + (M1-M2)$$

where

M1=sample mass and is about 3.0 g

M2=corrected sample mass

W1=actual moisture content of the sample (% as is)

The water and sample mixture is measured while going through a pre-defined profile of mixing, measuring, heating and cooling. This test provides dough viscosity information that translates into flour quality.

The key parameters used to characterize the present invention are pasting temperature, peak viscosity, peak viscosity time and final viscosity.

7. RVA Method

Dry Ingredients, Flour Blend and Ingredient Blend:

(1) Determine moisture (M) of sample from air oven (2) Calculate sample weight (S) and water weight (W).

(3) Place sample and water into canister.

(4) Place canister into RVA tower and run the Standard Profile (1).

8. RVA Method For Dough Characterization

Sample Preparation

During this procedure, the sample must be kept frozen at all times to prevent moisture loss. Therefore, these steps must be performed quickly or the sample must be in contact with dry ice or liquid nitrogen throughout this procedure.

Unsheeted dough (hopper dough) or sheeted dough (conveyer or recycle dough) can be collected from the production line.

1. Place the dough on an aluminum pie plate and slowly fill the plate with liquid nitrogen, trying to immerse all of dough in the liquid nitrogen. Allow the dough to freeze.

2. Place a metal strainer in a large funnel and put this over the liquid nitrogen dewar opening. Pour contents of the pie plate through the strainer and place the strained sample in a plastic bag.

3. Place a plastic bag on top of and below the sample bag and pound the sample with a hard object to break up the sample to pieces as small as 1 cm in size.

4. Grind the frozen sample in a coffee grinder for 15 seconds.

5. Place the sample on #16 mesh sieve and use a stiff bristle brush to pass the sample through.

6. Place the sieved sample in a Zip Lock® bag, or equivalent moisture-proof bag, and store in a freezer until ready to analyze.

Determining Moisture Content

Determine the moisture content of the sieved dough using a Mettler moisture analyzer or equivalent. Run the instrument at 130° C., auto profile, using 5+/−0.2 g of frozen sample.

RVA Analysis

RVA conditions: 25° C. idle to 2 minutes, ramp to 95° C. 2–7 min., hold 95° C. 7–10 min., cool to 25° C. 10–15 minutes, 25° C. hold and end at 22 minutes.

Sample weight determination: Sample weights and water added should be corrected for the sample moisture content to give a constant dry weight. Moisture basis should be 14% as is, sample mass is 3 g. Use the following formulas to determine the corrected sample mass ($M_2$) and correct water mass ($W_2$) for each sample.

$$M_2 = \frac{258}{(100-W_1)} \qquad W_2 = 25 + (3 - M_2)$$

where $M_2$=corrected sample mass (g)

$W_1$=moisture content of sample as determined above (%)

$W_2$=corrected water mass (g)

RVA Procedure

1. Start RVA software, select the test to run, and input sample information.

2. Weigh water (amount calculated as $W_2$ above) into RVA canister.

3. Weigh sample (amount calculated as $M_2$ above) onto flat Mettler moisture plate.

4. Transfer sample into RVA canister, place No. 8 rubber stopper over cup, invert, and shake vigorously 10 times.

5. Slide stopper off canister and then quickly scrape sample particles down canister walls with spindle blade.

6. Place canister with spindle on tower and lower tower to start the analyses.

9. Tensile Strength Measurement Sheeted Dough

References

Stable Micro Systems' *TA-XAT2 Texture Application Study N001/SPR*, 1995.

Stable Micro Systems' *User Guide for the TA-XT2I Texture Analyzer*, issue 1, 1997.

P. Chen, L. F. Whitney, and M. Peleg, *J. Texture Studies*, 25 (1994) 299.

C. H. Lerchenthal and C. B. Funt, in *Rheology and Texture of Foodstuff*, Society of Chemical Industry: London, 1968.

Principle

The tensile test is a mechanical stress-strain test measuring the tensile strength of the dough sheet. A dough sheet strip is mounted by its ends onto the testing machine that elongates the dough strip at a constant rate until the sheet breaks. The force (g) at which the sheet breaks is the tensile strength of the dough. The distance that the dough sheet stretches before breaking is the extensibility. The output of the tensile test is recorded as force/load versus distance/time.

Equiment

Stable Micro Systems Texture Analyzer TA-XT2 or TA-XT2i with 25 kg load cell capacity with Texture Expert Exceed Software and a 5 kg calibration weight.

Instron Elastomeric Grips (Model # 2713-001), which are called "Jaws" in this method. These Grips must be modified to fit the texture analyzer. First, the clamps must be cut away from the attaching stem and a hole must be drilled into the base of the clamps to allow the Grips to screw into the top and base of the Texture Analyzer instrument. Additionally, the spring on the clamps must be replaced with a spring with a lower force constant to relax the hold on the sample. Finally, the steel rollers must be flatten on one side and lined with a non-slick adhesive strip.

Dough Sheet.

Thickness gauge with accuracy to the nearest 0.0001 inches. Cutting device consisting of a Pizza Roller and a steel template to make 2½ cm by ~10 cm rectangular dough sheets. A steel bar 2½ cm wide and 2 feet long (length was not important) was made to serve as a template to cut out the correct dough strip width.

Large plastic zip lock bag or a tightly sealed air-tight container.

Procedures

Instrumental Set-Up

1. Attach the Instron Jaws on the instrument. Press "TA" on the menu bar, and then "Calibrate Force", then press "OK". Carefully place the 5 kg weight on the TA's Calibration Platform and press "OK". When the Calibration is successful, press "OK" and then carefully remove the 5 kg weight.
2. Press "TA" on the menu bar, and then select "Calibrate Probe". Ensure that the return distance is set to 45.00 mm and the trigger force is 5 g. Press "OK". Ensure that the two Jaws touch during the calibration procedure. If they do not, re-calibrate the probe. If the problem persists, increase the trigger force to 10 g and re-calibrate.
3. Press "TA" and then "TA Settings". Ensure that the settings are correct (see below) and then press "Update".

TA Settings:
Test Mode: Measure Force in Tension
Option: Return to Start
Pre-test speed: 3.0 mm/s
Test speed: 10 mm/s
Post test speed: 10 mm/s
Distance: 45 mm
Trigger Type: Auto
Trigger Force: 5 g
Units: grams
Distance: millimeters
Break Detect: Off Sample Preparation Dough Sheet Strip 1. Collect sheet with uniform thickness and at least 20 cm in length.
2. Cut the sheet into 2½ cm by ~10 cm strips. Cut sample length-wise parallel with the mill roller output. Cut all of the strips sequentially.
3. Protect the samples from moisture loss by placing the samples into a plastic zip lock bag or a tightly sealed air-tight container. The samples must be analyzed within 15 minutes of collection to ensure that the samples are analyzed fresh.

Sample Loading

Accurately measure and record the thickness of the dough strip. Attach one end of the strip to the upper clamp. Allow the strip to hang freely. Open the bottom clamp and insert the bottom end of the strip through. Lightly tap the freely hanging dough strip to verify that no tension is placed on the sample. Now close the bottom clamp. Verify that the dough strip looks properly placed on the Texture Analyzer and adjust it if needed.

Sample Analysis

Press "TA" then "Run a Test".

Assign a batch name and filename/number under the appropriate directory.

Press "Run". For subsequent strips from the same batch, simply press "TA" and then "Quick Test Run", or alternatively, press "Ctrl" "Q".

During the experiment, verify that the dough strip does not slip through the clamps. If they do, discard that sample result and analyze the next strip.

Unload the sample.

When running samples from a new batch, select "File", "New", "Graph Window", "OK".

Load the first strip and analyze as described above.

Data Analysis

Unless directed otherwise, report the average Force. The Force measurement is the maximum force before breakage, also known as the Tensile Strength of the material.

The other data in the printed report include the Time, Area, and Slope. The Time before breakage is a measure of the sample 10. Dough Dehydration Rate The purpose of this method is to measure the rate of water removal from a dough sample.

Sample Preparation

A sample of dough is collected and immediately granulated to a fine particle size by use of either an electric coffee grinder (Krupps) or a food processor (Cuisinart). The dough material is ground or cut for less than about 5 seconds to avoid smearing the material. The size of the dough pieces would be from about 400 to about 1000 microns.

Apparatus

1. LJ16 Moisture Analyzer Type PJ300MB made by the Mettler Toledo Co. Inc. of Hightstown, N.J.
2. Aluminum weighing tines for the moisture analyzer.
3. Coffee grinder (Krupps) or food processor (Cuisinart)
4. Spoonula or teaspoon Analysis Procedure 1. An empty weighing tin is placed on the balance within the moisture analyzer.
2. The moisture analyzer unit is in the closed position and the balance is tared to zero grams ±0.001 g.
3. The moisture analyzer is opened and 5 grams ±0.2 grams of dough are weighed onto the weighing tin.
4. The moisture analyzer is then closed and the heating temperature is at 120° C. and the time limit is set on automatic.
5. The unit is programmed to print out a result every 30 seconds.
6. The start button is pushed to start the measurement.
7. The measurement is complete when the light above the start button is blinking.

Data Interpretation

The moisture loss results reported at each 30 second time interval are converted into a grams of moisture contained within the dough per gram of solids basis. FIG. 9 shows an example dehydration plot. The dehydration rate can be calculate by Dehydration=((Moisture level at time 0)−(moisture level at 5 minutes))/5 minutes Rate where the moisture level is expressed as grams moisture/grams solids basis For Drying Curve # 1 the dehydration rate equals (0.55−0.10 grams moisture/gram solids)/5 minutes=9.0×10$^{-2}$ grams moisture/gram solids-minute Similarly, the dehydration rate=(0.44−0.24 grams moisture/gram solids)/5 minutes=4.0×10$^{-2}$ grams moisture/gram solids-minute 11. Water Activity
   a) Chambers capable of holding a constant head space composition for an extended period of time are first prepared. Glass dissecter chambers with a matching lid work well.
   b) The chamber is filled with a saturated aqueous salt solution. The solution is made by adding salt to the water until a precipitate forms at the bottom of the chamber. Suitable salts include, but are not limited to lithium chloride, lithium bromide, magnesium chloride, and potassium acetate.
   c) The solution is kept at a temperature between about 70–80° F.
   d) Snack chips are placed in the chamber and the chamber is sealed.
   e) The snack chips are allowed to equilibrate for between about 4 to 7 days.
   f) The snack chips are removed and quickly placed in the chamber of a calibrated Rotronic Hygroskop DT made by the Rotronic Co. Inc. of Huntington, N.Y. The chamber is maintained at a temperature between 70–75° F.
   g) Once the reading has stabilized for ten or more minutes, the water activity is read. The total moisture of the samples is measured by oven volatilization to generate a sorption isotherm curve.

12. Glass Transition Temperature

Using the Dynamic Mechanical Analyzer, PE DMA-7e, 3 point bending configuration:
   1. Turn on instrument in the following order. Any variation to the order/sequence could result in instrument not running properly.
      A) Turn on the computer and monitor. At the prompt, enter password and any other information requested.
      B) After the computer has completed the boot-up stage and displays the desktop, turn on the Dynamic Mechanical Analyzer. Wait about 30 seconds to 1 minute.
      C) Turn on the TAC. Allow the instrument to warm up about 30 minutes prior to running the first sample.
   2. Turn on the helium flow to 30 psi.
   3. Lower the furnace. Place a coolant in the instrument dewar. Possible coolants include ice water, dry ice, and liquid nitrogen. The instrument should never be run without a coolant to protect the instrument from high temperature (core temperature should never reach above 35° C.).
   4. On the computer desktop, select "Pyris Manager". This brings up the Perkin Elmer Pyris software.
   5. Select the "DMA-7" box. This brings up the DMA software module.
   6. Call up the method by selecting "File" on the menu bar and then "Open Method" and select the method to run. If a method has not been previously developed or saved, enter in the necessary method information on the method editor window.
      A) Sample information screen of the method editor window includes a space to include sample information such as: Sample ID, Operator ID, Comments, and File Name/Directory. Select and enter all fields with the appropriate information. Under "Measuring System/Geometry", ensure that the "3-Point Bending" option is selected. Enter in the probe diameter under "depth" (5 mm is typical) and the platform point separation distance under "width" (10 mm is typical). DO NOT enter information in the "height" or "zero" fields since the instrument will do this for you!
      B) Initial State Screen includes method information concerning the initial running parameters including the dynamic force, static force, frequency, and initial temperature. Ensure all the information on this screen is accurate. Make changes as appropriate. For chips, 100 mN static force and 85 mN dynamic force at 1 Hz frequency are typically used.
      C) Program Screen includes the thermal profile. Ensure information under the Program Screen is accurate. Make changes as appropriate. The temperature is typically ramped from 25° C. to 200° C. at 5° C./min for chips.

You are now ready to get the instrument ready to load a sample.
   7. Lower the furnace.
   8. Press "Probe Up" on the base of the Analyzer. Make sure that the 3 mm and 10 mm 3-point bending probe and base, respectively, are attached to the instrument.
   9. Clean surface of the sample holder with a Q-tip dipped in alcohol. Dry the surface well with a clean Q-tip.
   10. Place the zero height calibration piece on the platform and press "probe down". Raise the furnace.
   11. Wait for the probe position reading on the probe position window to stabilize. Once the probe position has stabilized, press "zero height" button icon on the right of the method editor screen. Make sure that the probe position resets to zero mm (+/−0.0005 mm). If it did not, press the "zero height" button again.
   12. Lower the furnace. Press "Probe up" and remove the zero height calibration piece.
   13. Place the sample on sample holder. Press "Probe Down" on the Analyzer base. If the sample moved when the probe hit the sample, press "Probe up" and re-position the sample such that the probe does not move the sample. Raise the furnace.
   14. Wait for the probe position reading on the probe position window to stabilize. Once the probe position has stabilized, press sample "height" button icon on the right of the method editor screen. Make sure that the probe height field sets to the sample height (+/−0.0005 mm). If it did not, press the "sample height" button again.
   15. Press the "start" button to begin the analysis.
   16. To view the data, select "Window" under the menu bar and then "Instrument Viewer". To display the moduli and tan delta select "Display" under the menu bar and then "modulus" (select both storage and loss modulus) and "tan delta". To display the data as a function of temperature, select the "T ↔t" icon, also called the "Temp/time X-axis" icon.

17. At the end of the run, the furnace will automatically cool. Take the sample off the sample holder using tweezers and clean the sample holder as described above.

However, DO NOT touch the furnace, especially when at elevated temperatures, since this furnace gets HOT.

Shut Down Procedure:
1. Make sure the furnace is raised and that the sample pan is clean.
2. Turn off the Pyris Perkin Elmer software.
3. Turn off the TAC.
4. Turn off the Thermal Analyzer.
5. Turn off the computer.
6. Turn off the helium flow.
7. Clean up bench top.

Data Interpretation:

The glass transition temperature was determined by a maximum in tan δ after a decrease in the E' plot. An example of this curve is shown in FIG. 10.

For doughs, 50 mN static force and 30 mN dynamic force at 1 Hz frequency were used. Temperature was ramped from −30° C. to 30° C. at 2° C./min. The glass transition temperature was determined by a sharp decrease in E' accompanied by a peak maximum occurring in E".

For chips, 100 mN static force and 85 mN dynamic force at 1 Hz frequency were used. Temperature was ramped from 25° C. to 160° C. at 5° C./min.

13. Solid Void Space & Surface Area by X-Ray Tomography

Instrument Description

The Micro-CT 20 was designed, developed and is supported by Scanco Medical AG, Zurich, Switzerland. It is comprised of an X-ray machine and a computer which collects, analyzes, and stores the data. The scanner has a 2-D fan beam acquisition with a fixed x-ray tube and detector configuration. The radiation from a micro-focus x-ray tube is attenuated by the bone sample. The transmitted x-rays then pass through a collimator (limits slice thickness), a scintillator (converts x-ray to light), and into a 1-D array of detectors. The sample is rotated on a spindle, creating a series of projections, which are combined to form a 2-D slice. By incrementally translating the sample, a set of contiguous 2-D slices can be acquired. It can image bone samples up to 17 mm in diameter and 40 mm in length with a resolution of approximately 25 microns. Further details on the design and use of MicroCT 20 are documented in the "MicroCT 20 User's Guide" provided by Scanco Medical AG.

Reference:

P. Ruegsegger. B Koller and R. Muller. A microtomographic system for the non-destructive evaluation of bone architecture. Calcif. Tiss. Int. 58(1996), 24–25.

Sample Preparation

Small pieces of Tortilla Chip are removed from the edges of each sample. These pieces are then placed in a Scanco mCT20 X-ray Computed Tomographic Scanner using a 17.4 mm sample holder. The samples were placed in the holder such that the smallest dimension of the chip sample (i.e., it's width) was along the z axis. This minimizes the number of slices needed to acquire. A scout scan allows the user to choose a region of interest along the z axis that included the entire sample. This resulted typically in about 100 slice acquisition. The isotropic resolution of the sample is approximately 34 microns. The integration time used for each projection is 350 msecs. Each slice consists of an 8 bit 512×512 grey level image. Upon scan completion, the data is transferred from the mCT20 scanner to an SGI workstation.

Image Analysis

A mask is then used to remove the sample holder from the image, leaving only the chip sample. A threshold of 60 is applied to the data, resulting in a binary image, where the chip sample is 255 and the background is 0.

Before measurements can be made, it is necessary to define a volume of interest which closely encloses the chip sample. A mask of this volume of interest is generated with the following steps:

1. The chip is subsampled by 2 in all dimensions for faster processing of the mask.
2. A connected components labeling operation is performed on the thresholded data to remove any small disconnected regions (this will remove spurious noise signals, since the chip sample is fully connected).
3. A floodfill operation is used to fill in any internal holes in the mask.
4. A rank filter is then used where a 15×15×15 neighborhood is used and each voxel is replaced with the voxel that ranks 75% highest in that neighborhood (this is similar to a median filter but in the median case a rank of 50% is used).
5. Magnify the resulting volume by two so it is the original size prior to subsampling in step 1.

At this stage, there are two volumes, the original data, simply thresholded at 60, and a binary mask of the tortilla chip volume. Two measurements of the data are then made:

Percent Solid of Total Chip Volume—The total volume of the mask is calculated by simple voxel counting, as well the total volume of chip sample is calculated by voxel counting of the original thresholded data. The volume of the chip sample, divided by the volume of the mask is the percent volume result.

% Solid=(Solid Chip Volume)/(Chip Mask Volume)

Surface Area Density—The surface area of the chip is calculated using a method if intersecting the surface with secants. This method is described in detail in [1]. This represents the surface area normalized by the chip mask volume:

Surface Area Density (mm−1)×(Surface Area of the solid chip)/(Volume of the chip mask)

Surface Area/Solid Chip Volume—This is the surface area normalized by the solid chip volume.

14. Surface Characteristics Via Laser Profilometry Imaging

Both surfaces of tortilla chips are imaged using an Inspeck-3D high-resolution 3D surface scanner with the following specifications.

Manufacturer: Inspeck Inc, Quebec City, PQ G1N4N6, Canada

Built in camera: Kodak MegaPlus Monochrome camera

Spatial resolution: 1024×1024 pixels

Field of view: 67 mm×67 mm

Depth of field: 25 mm

Lateral resolution: 65 micron

Depth resolution: 10 micron

Object distance: 23–30 cm
Scan time: <0.3 s
Processing time: 40–180 s.

2. Inspeck—3D scanning method is based on phase-shifted moiré interferometry. 3–4 images of shifted fringe patterns are acquired to calculate 3D surface coordinates.

3. Chips are mounted vertically and placed at the required object distance. A built-in cross hair visual aid is used to place the chip surface at the required distance and within the depth of field.

4. A grid of 3D coordinates is derived from the 4 2D images by using "phase unwrapping" and calibration procedures included in Inspeck's Fringe Acquisition and Procession (FAPS v3.0) software.

5. 3D coordinates are exported in an ASCII text file containing x-y-z coordinates. The points are exported at a spatial resolution of 130 micron (½ max resolution of scanner).

6. X-Y-Z coordinates are converted into a floating point grey scale image using P&G-developed routines and Optimas Image Analysis software v6.5 (Media Cybernetics, 8484 Georgia Avenue, Suite 200, Silver Spring, Md. 20910). The routines simply read the x-y-z coordinates in the exported text file and place the z values into a regular 2D array corresponding to the number of samples in the x and y directions obtained through the Inspeck-3D scanner. This 2D array can be displayed as an image where the intensity of each pixel in the image is proportional to the z (height) value stored at that pixel position.

7. After each x-y-z file is converted to a 2D image, a local background leveling procedure included in Optimas v6. is used to remove the overall curvature of the tortilla chip to facilitate measurement of surface texture. Retaining the chip curvature would influence the texture measurements. A window size of 16×16 is selected as a parameter for the background leveling procedure 5 (See description below).

8. After background leveling, a rectangular region of interest of size 195×250 pixels is manually extracted from each image. This is an arbitrary region of interest is chosen at the center of the chip surface so as to minimize the influence of any potential edge artifacts.

9. For each rectangular region of interest, 3 texture measures provided by the Optimas software are extracted. Since the pixel intensities correspond to elevation values, the texture measures are a reflection of the surface characteristics. The 3 texture measures extracted are Fractal texture, Surface Area Density, and Roughness (See Descriptions below).

Description of Optimas Background Leveling Procedure used in Step 7. (From Optimas Help File)

An uneven background can make it impossible for you to set a single gray scale threshold value that isolates foreground objects over the whole ROI. The Local smoothing and threshold command on the Threshold submenu of the Image menu allows you to correct the luminance in images with sharply or unevenly varying backgrounds. After you use this command, the proper threshold is often much easier to set.

OPTIMAS takes local averages of the image luminances, then uses these local averages to correct the individual ROI pixel luminance values. You can specify the size of the region you want to use for background luminance averaging.

Note: To correct smoothly varying luminance changes, use the Global smoothing and threshold command. To display the Local Smoothing and Threshold dialog box, select Threshold from the Image menu and then select Local Smoothing and Thresholding from the submenu.

Using the Local Background Correction dialog box:
1. Select Light Objects, Dark Objects, or Manual from the Auto Threshold group. Click on Threshold to view the setting or to manually set the threshold.
2. In Averaging Box Size, select either pixels or calib. Click on Draw Box to set the averaging box size. Click on the primary mouse button to draw the ROI on the screen. The X and Y edit boxes will reflect the size of the box you have drawn. You can also type in the box size if you wish.
3. Click on Apply to begin the process. Click on Restore to clear the correction.
4. To perform the correction on your image, click OK. OPTIMAS saves the background correction and closes the dialog box. To close the dialog box without performing a background correction, click Close.

Description of Texture Measures (Extracted from Optimas Help Files)

Fractal Texture

The fractal dimension characterizes how a surface changes when measured at different resolutions.

ArFractalTexture is estimated from $2+((\log 10(SurfaceArea) - \log 10(SurfaceArea3 \times 3))/\log 10(2))$ where SurfaceArea is an estimate of the surface area of the image and SurfaceArea3×3 is an estimate of the surface area at 3×3 neighborhood resolution. See MacAulay,Calum and Palcic, Branko, "Fractal Texture Features Based on Optical Density Surface Area", Analytical and Quantitative Cytology and Histology, vol 12, no. 6, December 1990. Also see Peleg, Shmuel, et. al., "Multiple Resolution Texture Analysis and Classification", IEEE Transactions on Pattern Analysis and Machine Intelligence, VOL. PAMI-6, NO. 4, July 1984.

Surface Roughness

A double precision value which can be extracted from area screen objects giving the variance in engineering units (mm).

Surface Area Density

A double precision value which can be extracted from area screen objects giving the total surface area divided by the pixel count (sq.mm/pixel). The surface area is calculated by summing the areas of the tops and the "sides" of each pixel. A single bright pixel with value pixel-value in a zero surround would have a surface area given by (pixel-width*pixel-height+2*pixel-width*pixel-value+2*pixel-height*pixel-value where pixel-width and pixel-height are the distances between pixels in the x and y direction respectively. See Calum MacAulay and Branko Palcic, "Fractal Texture Features Based on Optical Density Surface Area", Analytical and Quantitative Cytology and Histology, vol 12, no. 6, December 1990.

15. Interior Bubble Wall Thickness, Length & Height Breadth Measures

There should be a sample size of six for analysis by scanning electron microscopy.

The specimens are initially fractured and de-fatted using hexane. Each specimen is then polished to a flat surface using graded sandpaper in order to create a cross section of the chip that followed a random plane. This technique is developed for three reasons: first, a planar cross section of the chip allows for clear identification of the section through fine surface scratches; second, the microscope can be adjusted to a shorter working distance, reducing the depth of field to keep only the cross section in focus; third, a planar cross section does not favor weak areas in the same manner as a fractured surface. For this analysis, the initial polishing to flatten the sample is completed following hexane extraction, using a #3 graded sandpaper. Final polishing is done with a #1/0, #2/0, #3/0, and #4/0 emery polishing paper (3M). Specimens are then sputter coated with gold palladium 90 seconds, while rotating the coater stage, with current set at 45 mA, and initial sputter vacuum at 50 mTorr.

The Jeol T-300 Scanning Electron Microscope is adjusted for focus at a 20 mm working distance, 10 kV operating voltage, spot size setting at 2:00, and magnification 100×. Tilt control is used to adjust the sample plane perpendicular to the electron beam. This can be initially done by sight when placing the specimen in the microscope, and then fine-tuned by using the X specimen control to ensure the polished surface remains in focus while moving the specimen. Focus and stigmation are adjusted accordingly. SEM TV output is attached to a computer configured with Optimas v. 6.51.

The computer is running Optimas 6.51 with the SEM 100× configuration menu open, magnification calibration set to 100×. The Optimas camera acquire menu is adjusted to brightness setting 95, contrast setting 135 (these produce a nice range of B&C with minimal contrast adjustment on the T-300 SEM). Data collection sets is selected to "line morphometry set", and the set edited to include only mLnlength, leaving the window open. Edit options within Optimas is set to include overlays with regions of interest. Excel is running simultaneously with a column and row selected (within the spreadsheet) for the bubble of interest.

From the live image, adjusted to a field of interest on the bubble wall, the macro bubblethick.mac is run. This macro includes a screen in which several lines are drawn across the bubble wall by the operator. These lengths are then extracted and exported to Excel as part of the macro. The image of the lines and micrograph are exported to the clipboard, and can be pasted into a color file using Adobe Photoshop 5.5.

Method for collecting length and breadth data from tortilla product. Specimens are prepared to obtain a flat cross-section of a surface blister at the approximate center of the feature. This cross section is photographed using either a SEM or stereomicroscope. The void area of the bubble is then selected, and its maximum length and breadth measured and calculated Computer Program Macro Routines (Macro bubblethick.mac)

```
// average_nf.mac
// averages II_max_i greyscale images by integrating into
// a short array
// By G. Landini <G.Landini@bham.ac.uk>
INTEGER II_i,
II_max_i=Prompt("Average (<=256):","INTEGER","64");
BYTE II_T[,];
SHORT II_G[,];
II_G=GetPixelRect( );
II_G[,]=0;
if (II_max_i){
    BeginOrEndUpdateBlock( TRUE);
    for (II_i=0;II_i<II_max_i;II_i++){ //grab II_max_i images
        grab(3);
        StatusBar="Capturing ":Totext(II_i+1);
        II_T=GetPixelRect( );
        II_G=II_G+II_T;
    }
    II_G=II_G/II_max_i;
    PutPixelRect(,(BYTE)II_G);
    BeginOrEndUpdateBlock( FALSE);
}
StatusBar="";
ObjectWildCardList ("II_.*",2);
Beep( );
DuplicateImage ( );
// end
RunMacro ("C:/Program Files/Optimas 6.5/macros/average1.mac");
RunMacro ("C:/Program Files/Optimas 6.5/macros/repline.mac");
MultipleExtractAll (TRUE);
ExportMeasurementSet ( );
ImageToClipboard (, FALSE);
while( CreateLine( ) );
MultipleMode = TRUE;
```

16. Dough Viscosity Via Capillary Rheometry
   A. Dough is mixed by first weighing 300 grams of flour blend into the bowl of a food processor mixer.
   B. The mixer is turned on and about 141 grams of water at a temperature between about 160 to 180° F. is quickly added.
   C. The dough is mixed for sufficient time to attain a cohesive consistency.
   D. A sample of dough is placed in a Rheograph Model 2003 capillary viscometer made by Gottfert, GmBh using a 1.5 mm capillary tube.
   E. The temperature of the dough and rheometer is maintained at about 113° F.

17. Chip Vibration Breakage Assessment Method
   A. 25 chips are arranged in a nested fashion. The chips all initially contain intact, non-broken surface bubbles. The weight of the chips is recorded.
   B. The nested chips are placed in a holder with a similar cross sectional size and shape such that the movement of the nested arrangement is restricted.
   C. The holder containing the chips is attached securely to a Model J1A bench scale vibration table made by the Syntron Co. Inc. of Home City, Pa.
   D. The vibrator is turned on to a setting of 8 and the chips are allowed to vibrate for 2 minutes.
   E. The chips are removed from the holder and the number of broken bubbles is counted.

18. Dough Adhesion Via Power Consumption

Purpose

The purpose of this method is to indirectly measure the adhesive properties of a dough by the rate of power consumption observed during a controlled, lab scale mixing test.

Apparatus
   1. Model 702R Hamilton Beach Dual Speed food processor with standard cutting blade.
   2. Model 4113 Power Harmonics Analyzer (Power Meter) made by Fluke Co. Inc.
   3. Portable or lap top computer loaded with Fluke Software connected to the power meter per manufacturers instructions.

Sample Preparation
   1. For doughs made from dry ingredients, 200 to 300 grams of the ingredient blend at the desired composition are homogenously blended.
      a. The pre-blend is added to the bowl of the food processor and the top of the food processor is securely placed on the unit.
      b. The food processor is turned on at Speed setting number 2 (1965 RPM) and allowed to mix for about one minute.
      c. The desired amount of water at the desired temperature is pre-weighed and added quickly (in about 15 seconds or less) to the flour blend as it is mixing to form a dough.

2. For doughs that comprise a wet pre-cooked starch-based material, 200 to 300 grams of the total ingredient blend containing the wet pre-cooked starch-based material are pre-weighed at the desired composition and blended by the following procedure:
   a. The wet pre-cooked starch based material is added at the desired weight to the bowl of the food processor.
   b. All of the remaining ingredients are then added to the bowl of the food processor. The top of the food processor bowl is then placed securely on the unit.
   c. The food processor is turned on at Speed setting number 2 (1965 RPM) and allowed to mix for about one minute.
   d. Water is then added (in about 15 seconds or less) at the desired temperature to reach the desired level of total water addition.

Measurement Procedure

1. The power meter is attached to a computer containing the operating software and the source of power (110 volts) is routed through the power meter such that a plug receptacle attached to the power meter is provided for the food processor. The food processor is then plugged into this receptacle and the power meter is turned on according to the manufacture's instructions. The data logging interval is set at 10 seconds.
2. Baseline power consumption is first established by measuring the power consumed to turn the blade of the food processor when the bowl is empty. The power meter is first turned on and allowed to stay on for about one minute while the food processor is off to establish a zero baseline. Then the power meter is turned on and the food processor is kept on for about two minutes. The food processor is then turned off while the power meter is still kept on for another minute to re-establish a zero baseline. The baseline power consumption is calculated as the average of all of the power consumption readings over the two minute measurement period.
3. The power consumption from mixing a dough is measured by the following procedure:
   a. The power meter is turned on while the food processor is off for at least a minute to establish a zero power consumption baseline.
   b. The ingredient blend ingredients are pre-weighed and added to the food processor bowl by the procedures described in sample preparation.
   c. The water is added to the food processor bowl by the procedures described in sample preparation.
   d. The test is allowed to run for about 5 minutes collecting power consumption data every 10 seconds provided the dough does not form an agglomerated, adhesive mass that restricts the operation of the food processor. If the food processor become inoperable due to the condition of the dough, the test is stopped.

Data Interpretation

1. The baseline power measured from the empty food processor is subtracted from each power measurement.
2. The power consumption minus the baseline power consumption is plotted versus the time of the measurement within the test period.
3. Initially, within about the first 30 seconds, the power consumption readings will fluctuate until the dough becomes more homogeneously mixed. Only data after the first 45 seconds of mixing is analyzed to avoid this artifact.
4. The Adhesion Power Consumption Factor (APCF) is determined by analyzing for steep rises in power consumption over time after the first 45 seconds of mixing. The slope of the power line over any 30 second mixing interval after this point can be used to calculate the APCF.

Example Calculation

Referring to the upper curve of FIG. 8, an obvious rise in power consumption at about 70 to 80 seconds into the test can be observed. Calculating the APCF between 60 to 90 seconds would be as follows:

$$APCF=(0.29\ kw-0.14\ kw)/30\ seconds=5.0\times10^{-3}\ kw/second$$

EXAMPLES

The following examples are illustrative of the present invention, but are not meant to be limiting thereof.

Example 1

A Flour Blend:

| Ingredient | % Flour by Weight Flour Basis |
| --- | --- |
| White Corn Masa Flour | 73.2 |
| Pre-Gelled Sago Palm Starch | 9.0 |
| Native White Corn Flour | 7.1 |
| Modified Food Starch, Crispfilm ® | 6.0 |
| Resistant Starch, Novelose 240 ® | 2.2 |
| Corn Protein | 0.9 |
| Salt | 0.5 |
| Sugar | 1.0 |
| Powdered Lecithin, Precept 8162 | 0.1 |
| Total | 100.0 |

Properties of the Flour Blend:

| Attribute | Value |
| --- | --- |
| Flour Blend % by weight on U.S. #25 Screen | 10.6 |
| Flour Blend % by weight on U.S. #40 Screen | 10.0 |
| Flour Blend % by weight on U.S. #100 Screen | 50.1 |
| Flour Blend % by weight thru U.S. #100 Screen | 29.3 |
| Flour Blend Paste Temperature, ° C. | 70 |
| Flour Blend Peak Viscosity, CP | 590 |
| Flour Blend Final Viscosity, CP | 1187 |
| Flour Blend WAI | 3.2 |
| Masa % by weight on U.S. #25 Screen | 13.5 |
| Masa % by weight on U.S. #40 Screen | 13.8 |
| Masa % by weight on U.S. #100 Screen | 32.0 |
| Masa % by weight thru U.S. #100 Screen | 40.7 |

Example 2

A Flour Blend:

| Ingredient | % Flour by Weight Flour Basis |
| --- | --- |
| White Corn Masa Flour | 67.6 |
| Pre-Gelled Corn Flour | 19.5 |
| Native White Corn Flour | 8.0 |
| Resistant Starch, Novelose 240 ® | 3.4 |
| Salt | 1.1 |
| Powdered Lecithin, Precept 8162 ® | 0.4 |
| Total | 100.0 |

Example 3

The flour of Example 1 is mixed with water in the following proportion to yield a sheetable dough:

Example 1 Flour 68%
Water 32%

Example 4

The dough of Example 3 is milled to a thickness of 0.032 inches and cut into isosceles triangle shapes and then fried between a pair of constraining molds where the molds are the shape of a spherical cap with a 2 inch radius of curvature. The chips are fried at 400° F. to a final moisture content of 1.4% to yield a chip weight of 2.40±0.04 g with a length of 61±2 mm by a width of 55±2 mm.

Example 5

A Flour Blend:

| Ingredient | % Flour by Weight Flour Basis |
|---|---|
| White Corn Masa Flour | 79.7 |
| Pre-Gelled Sago Palm Starch | 6.1 |
| Native White Corn Flour | 4.4 |
| Modified Food Starch, Thermtex ® | 7.7 |
| Corn Protein | 0.9 |
| Salt | 0.5 |
| Sugar | 0.5 |
| Powdered Lecithin, Ultralec-F ® | 0.2 |
| Total | 100.0 |

Example 6

A Flour Blend:

| Ingredient | % Flour by Weight Flour Basis |
|---|---|
| White Corn Masa Flour | 80.8 |
| Pre-Gelled Sago Palm Starch | 6.1 |
| Native White Corn Flour | 4.4 |
| Modified Food Starch, Thermtex ® | 7.7 |
| Salt | 0.5 |
| Sugar | 0.5 |
| Total | 100.0 |

Example 7

The flour of example 5 or 6 is blended with between about 32.5% added water to make a sheetable dough.

Example 8

The dough of Example 7 is milled to a thickness of 0.032 inches and cut into isosceles triangle shapes and then fried between a pair of constraining molds where the molds are the shape of a spherical cap with a 2 inch radius of curvature. The chips are fried at 400° F. to a final moisture content of 1.4% to yield a chip weight of 2.40±0.04 g with a length of 61±2 mm by a width of 55±2 mm.

Incorporation by Reference

All of the aforementioned patents, publications, and other references are herein incorporated by reference in their entirety. Also incorporated herein by reference are U.S. Provisional Application Ser. No. 60/202,394, "Nested Arrangement of Snack Pieces in a Plasic Package"; U.S. Provisional Application Ser. No. 60/202,719, "Snack Piece Having an Improved Dip Containment Region"; and U.S. Provisional Application Ser. No. 60/202,465, "Method of Consistently Providing a Snack Piece with a Dip Containment Region," all filed May 8, 2000, by Zimmerman.

What is claimed:

1. A method for making a dough based snack chip having raised surface features comprising:

a. from about 12% to about 40% large surface features;

b. from about 20% to about 40% medium surface features; and c. from about 25% to about 60% small surface features;

wherein said dough based snack chip comprises one or more gelatinized regions and wherein said method comprises a frying step, said frying step comprising frying the snack chip with at least one molding surface, and wherein said frying step actuates the formation of said surface features.

2. The method of claim 1, wherein said molding surface has perforated openings.

3. The method of claim 2, wherein the level of open area in the molding surface is greater than about 35%.

4. The method of claim 3, wherein the level of open area in the molding surface is from about 35% to about 60%.

5. The method of claim 1, wherein the snack chip is constrained against a molding surface, and wherein the gap between a constraint and said molding surface is greater than about 0.06 inches.

6. The method of claim 1, wherein the snack chip is constrained against a molding surface, and wherein the gap between a constraint and said molding surface is from about 0.06 inches to about 0.25 inches.

7. The method of claim 1, wherein said snack chip is fried between a pair of constraining molds.

8. The method of claim 1, wherein said molding surface has a surface temperature greater than about 100° F.

* * * * *